US011077693B2

(12) United States Patent
Yamamoto

(10) Patent No.: US 11,077,693 B2
(45) Date of Patent: Aug. 3, 2021

(54) HOT-STAMPING FOIL AND PRINT EQUIPPED WITH LAMINATED OPTICAL DECORATION

(71) Applicant: TOPPAN PRINTING CO., LTD., Tokyo (JP)

(72) Inventor: Hanako Yamamoto, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/653,411

(22) Filed: Oct. 15, 2019

(65) Prior Publication Data

US 2020/0039273 A1 Feb. 6, 2020

Related U.S. Application Data

(63) Continuation of application No. PCT/JP2018/016372, filed on Apr. 20, 2018.

(30) Foreign Application Priority Data

Apr. 21, 2017 (JP) ............................ JP2017-084548

(51) Int. Cl.
*B44C 1/17* (2006.01)
*B41M 5/382* (2006.01)
(Continued)

(52) U.S. Cl.
CPC ......... *B41M 5/38214* (2013.01); *B32B 27/20* (2013.01); *B41M 5/392* (2013.01); *B41M 5/5254* (2013.01); *B44C 1/17* (2013.01)

(58) Field of Classification Search
CPC ................................ B44C 1/17; B44C 1/1729
(Continued)

(56) References Cited

U.S. PATENT DOCUMENTS

| | | | | |
|---|---|---|---|---|
| 2005/0191560 A1* | 9/2005 | Otaki | B44C 1/1716 | 430/1 |
| 2008/0316556 A1* | 12/2008 | Eto | B42D 25/29 | 359/3 |
| 2020/0039273 A1* | 2/2020 | Yamamoto | B41M 5/38214 | |

FOREIGN PATENT DOCUMENTS

| | | | |
|---|---|---|---|
| JP | 2001-71698 | 3/2001 | |
| JP | 2008006709 A * | 1/2008 | B32B 27/00 |
| JP | 2009-291996 | 12/2009 | |

OTHER PUBLICATIONS

International Search Report dated Jul. 17, 2018, in corresponding International Patent Application No. PCT/JP2018/016372.

(Continued)

*Primary Examiner* — Betelhem Shewareged

(57) ABSTRACT

A hot-stamping foil which is transferred to a transfer target by applying a transfer thermal pressure, including: a carrier that is a base film or a coated base film; a laminated optical decoration having a laminated optical structure formed on the carrier; a sinking control layer which contains a soft resin and a deformation limiting agent and is formed on the laminated optical structure; and an adhesive layer which is formed on the sinking control layer, wherein the adhesive layer contains a resin component which contains a thermoplastic resin having a glass transition temperature lower than room temperature and defines the thickness of the adhesive layer, and spacer particles which have a particle size larger than the thickness of the adhesive layer and some of which protrude from the resin component, and wherein the spacer particles sink into the sinking control layer after transfer thermal pressing.

24 Claims, 7 Drawing Sheets

(51) Int. Cl.
*B41M 5/392* (2006.01)
*B41M 5/52* (2006.01)
*B32B 27/20* (2006.01)

(58) Field of Classification Search
USPC ........................................................ 428/32.79
See application file for complete search history.

(56) References Cited

OTHER PUBLICATIONS

Written Opinion of the International Searching Authority dated Jul. 17, 2018 in corresponding International Patent Application No. PCT/JP2018/016372.

* cited by examiner

HOT-STAMPING FOIL AND PRINT EQUIPPED WITH LAMINATED OPTICAL DECORATION

CROSS REFERENCE TO RELATED APPLICATIONS

This application is a continuation application based on a PCT Patent Application No. PCT/JP2018/016372, filed Apr. 20, 2018, whose priority is claimed on Japanese Patent Application No. 2017-084548, filed on Apr. 21, 2017, the content of which is incorporated herein by reference.

BACKGROUND

A hot-stamping foil has been reported. A method of hot-stamping a hot-stamping foil onto a transfer target has been reported. A transfer target equipped with a laminated optical decoration has been reported. The transfer target equipped with a laminated optical decoration can be obtained by hot-stamping a hot-stamping foil onto a transfer target. In addition, a method of hot-stamping a hot-stamping foil onto a print has been reported. A print equipped with a laminated optical decoration has been reported. The print equipped with a laminated optical decoration can be obtained by hot-stamping a hot-stamping foil onto a print. Examples of prints include paper able to be printed upon, a polymer film able to be printed upon, printed paper, or a printed polymer film.

Priority is claimed on Japanese Patent Application No. 2017-084548, filed Apr. 21, 2017, the content of which is incorporated herein by reference.

A hot-stamping foil is hot-stamped onto a transfer target. The transfer target can be a print. The print can be a security print. The security print is a printing for which a forgery preventing technology is required. A forgery preventing technology is a technology for preventing abuse such as forgery, tampering, and theft of information that is meant to be kept secret or for easily determining whether abuse has occurred. The hot-stamping foil can be a hot-stamping foil that is hot-stamped onto the security print. Examples of security prints include tickets, banknotes, authentication cards, tags, stickers, authentication pages, game cards, gift certificates, certificates, posters, greeting cards, and business cards. The hot-stamping foil is adhered to the surface of the security print for which authentication is required.

It is known that there is an increasing demand for application of a hot-stamping foil to generally expensive goods such as luxury goods, and as proof of authenticity, a hot-stamping foil can be hot-stamped and applied to an article and the like. A hot-stamping foil can effectively satisfy such requirements. In addition, when the hot-stamping foil is hot-stamped on the print, it is possible to impart a visual effect with excellent design properties to the print.

In recent years, as one of technologies for exhibiting optical effects in hot-stamping foils, a so-called optical(ly) variable device (OVD) which is an attachable laminated optical decoration using technologies such as holograms and diffraction gratings that can express a three-dimensional image, a special decorative image, and a special color vary using light diffraction, or a multilayer thin film which causes a color shift depending on a viewing angle according to a plurality of inorganic deposition layers with different refractive indexes has been used.

Since an OVD requires advanced production technologies, has unique visual effects, and can be used to determine authenticity at a glance, it is used by being formed on a part or the entire surface of cards, securities, certificates, and the like as an effective forgery prevention unit. In recent years, in addition to security, it has been widely used as an authentication seal that is adhered to sporting goods, computer parts, and software for other electronics, and proves authenticity of the product, and as a sealing sticker that is adhered to the package of such products.

Generally, an OVD is a forgery prevention unit that makes sophisticated forgery difficult and easy to detect. When an OVD is adhered to paper or plastic such as tickets, banknotes, cards, and books, a thermal transfer method is used in many cases in order to make it difficult to replace it. In order to cope with the increasing demand for an OVD which has a laminated optical structure, it is required to improve the throughput of thermal transfer. In order to improve the throughput of thermal transfer, a hot-stamping foil that can be transferred to a transfer target with a small amount of heat is necessary. Therefore, a pressure-sensitive adhesive having strong tackiness and favorable adhesion, and a thermoplastic resin-based hot melt adhesive which can be adhered with a small amount of heat and having a low melting point are used for an adhesive layer of a hot-stamping foil.

However, when a pressure-sensitive adhesive having strong tackiness or a hot melt adhesive having a low melting point is used, there are problems that blocking may occur during storage, a part of the product may stick during storage and generate defects, and the hot-stamping foil may become unusable before transfer. In order to address such problems, an adhesive having a blocking prevention effect has been proposed (for example, refer to Japanese Unexamined Patent Application, First Publication No. 2001-71698, and Japanese Unexamined Patent Application, First Publication No. 2009-291996). In the technologies described in Patent Literature 1 and 2, fillers are added to the adhesive to reduce a contact area between the adhesive layer and the substrate, and thus blocking is prevented.

SUMMARY

A first aspect of the present invention is a hot-stamping foil which is transferred to a transfer target by applying a transfer thermal pressure, including: a carrier that is a base film or a coated base film; a laminated optical decoration having a laminated optical structure formed on the carrier; a sinking control layer which contains a soft resin and a deformation limiting agent and is formed on the laminated optical structure; and an adhesive layer which is formed on the sinking control layer, wherein the adhesive layer contains a resin component which contains a thermoplastic resin having a glass transition temperature lower than room temperature and defines a thickness of the adhesive layer, and spacer particles which have a particle size larger than the thickness of the adhesive layer and a portion of which protrude from the resin component, and wherein the spacer particles sink into the sinking control layer after transfer thermal pressing.

A second aspect of the present invention is a print equipped with a laminated optical decoration in which a laminated optical decoration is thermally transferred to a print using the hot-stamping foil of the present invention.

DETAILED DESCRIPTION

An Embodiment of the present invention will be described below with reference to the drawings.

Figure 1:
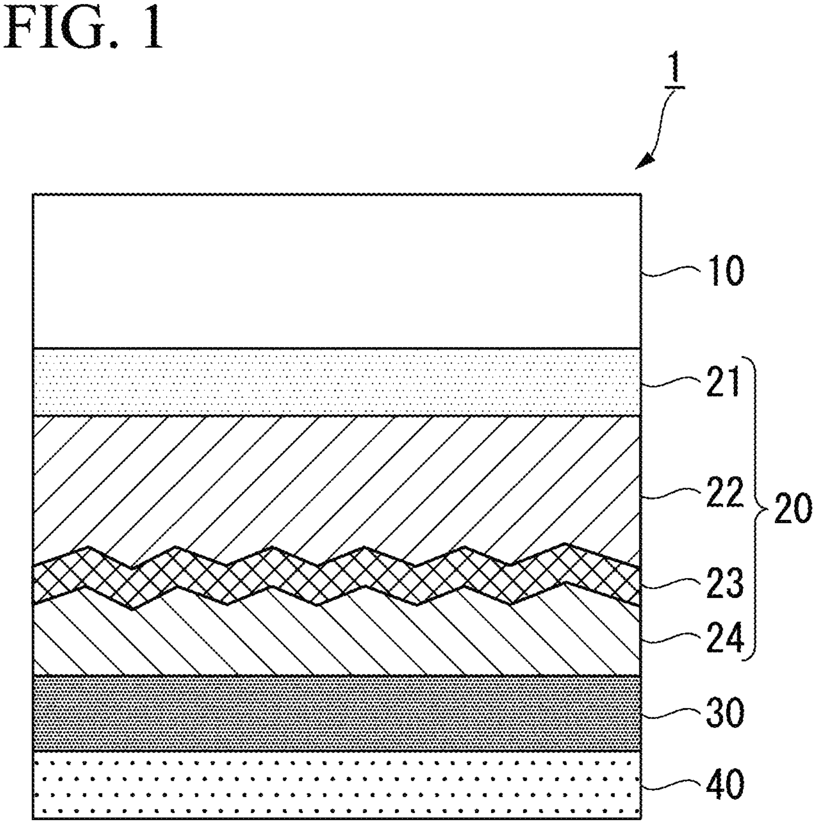
FIG. 1 is a cross-sectional view schematically illustrating a hot-stamping foil according to an embodiment.

FIG. 1 is a cross-sectional view schematically illustrating a hot-stamping foil 1. The hot-stamping foil releasably holds a laminated optical decoration 25. The hot-stamping foil can transfer the laminated optical decoration 25 to a transfer target by thermal pressing. The hot-stamping foil 1 includes a carrier 10 and the laminated optical decoration 25 formed on the carrier 10. The carrier 10 and the laminated optical decoration 25 are in contact with each other. The laminated optical decoration 25 includes a laminated optical structure 20, a sinking control layer 30 formed on the laminated optical structure 20, and an adhesive layer 40 formed on the sinking control layer 30. The laminated optical structure 20 and the sinking control layer 30 are in contact with each other or a coating layer may be provided therebetween. The sinking control layer 30 and the adhesive layer 40 are in contact with each other.

The carrier 10 holds the laminated optical decoration 25 until the hot-stamping foil 1 is thermally transferred to a transfer target. After the hot-stamping foil 1 is thermally transferred to the transfer target, the carrier 10 is released at a boundary with the laminated optical structure 20. In other words, after the hot-stamping foil 1 is thermally transferred to the transfer target, the carrier 10 is released at a boundary with the laminated optical structure 20. The carrier 10 is a base film or a coated base film. The base film can be a single layer or multilayer polymer film. The polymer film can be produced by an extrusion method, a solvent casting method or a calendar method. Regarding the extrusion method, an inflation method or a T-die method can be applied. In addition, the polymer film can be an extended or non-extended film. The material of the polymer film can be a thermoplastic or a soluble resin. The thermoplastic can be a polyolefin. The polyolefin may be polyethylene terephthalate (PET), polyethylene naphthalate (PEN), or polypropylene (PP). A polyolefin has appropriate adhesiveness with respect to the laminated optical structure 20. The polyolefin resin can releasably hold the laminated optical structure 20. The base film can be a heat-resistant film or a pressure-resistant film. The heat-resistant material and the pressure-resistant material can reduce deformation and deterioration due to heat and pressure applied during transfer. In the coated base film, one surface or both surfaces of the base film are coated. In this coating, a resin alone or a powder-containing resin can be coated. In this coating, micro gravure coating, gravure coating, die coating, or screen coating can be applied. The coating resins can be an acrylic resin, a silicone resin, and a fluorine resin, any copolymer resin of the aforementioned resins, any composite resin of the aforementioned resins, and any composite resin of the aforementioned copolymer resin. The powder contained in the resin can be silica powder, silicone powder, fluorine powder, and carbon powder. When coating is performed on the side of the laminated optical structure, it is possible to adjust holding and releasing of the laminated optical structure. When coating is performed on the side opposite to the laminated optical structure, it is possible to prevent blocking of the laminated optical structure with the adhesive layer, smooth transfer of the hot-stamping foil, or both. The thickness of the base film in the carrier 10 can be, for example, equal to or greater than 4 μm. When the thickness is less than 4 μm, the physical strength as a carrier is insufficient, and it is difficult to handle the hot-stamping foil. The thickness of the carrier 10 can be in a range of 12 to 50 μm.

In addition, depending on the application and purpose, the base film can be paper, synthetic paper, plastic multilayer paper, or resin-impregnated paper.

The laminated optical structure 20 includes a top layer 21, a lacquer layer 22, and an inorganic deposition layer 23 in order from the side of the carrier 10. The lacquer layer 22 is formed on the entire surface on the top layer 21, formed on a part thereof, or omitted. When the lacquer layer is omitted, the inorganic deposition layer 23 can be formed on the top layer 21. The inorganic deposition layer 23 can be formed on the lacquer layer 22. In addition, a coating layer 24 may be provided on the side opposite to the lacquer layer 22 of the inorganic deposition layer 23. A basic configuration of the laminated optical structure 20 is well known, but respective layers will be described below.

The top layer 21 releasably supports the laminated optical structure 20 from the carrier 10. After the hot-stamping foil 1 is transferred, the top layer 21 of the laminated optical structure 20 is positioned on the side opposite to the transfer target, and protects the laminated optical structure from external damage.

The top layer 21 can be a layer containing a thermoplastic polymer and a surface modifier. The thermoplastic polymer of the top layer 21 can be a resin having a glass transition temperature of 90° C. or higher and 130° C. or lower. The thermoplastic polymer can be an acrylic polymer, polyester, a polyamide, and a polyimide, any copolymer of the aforementioned materials, any composite of the aforementioned materials, and any composite of the aforementioned copolymer. The surface modifiers can be powders, waxes, or oils. The powder can be a heat-resistant powder. The heat-resistant powders can be silica powder, polyethylene powder, fluorine powder, and silicone powder. The wax can be paraffin wax, silicone wax, and Carnauba wax. The oil can be a silicone oil. The top layer 21 may be colored. It can be colored by adding a pigment or a dye to the resin of the top layer 21. The pigment can be an inorganic pigment, an organic pigment, and mixtures of the inorganic pigment and the organic pigment. In addition, the pigment can be a fluorescent pigment, a pearl pigment, or a magnetic pigment alone, a blend of the same types, mixtures of different types, and mixture of the different type and the blend of the same type. The dye can be a natural dye, a synthetic dye, and mixtures of the natural dye and the synthetic dye. The dye can also be a fluorescent dye. The top layer 21 can be formed on the carrier 10 by printing or application. The application can be performed by gravure coating, micro gravure coating, or die coating. The printing can be gravure printing and screen printing. The thickness of the top layer 21 can be in a range of 0.5 μm or more and 5 μm or less. The top layer 21 can accept printing thereupon. The acrylic resin easily accepts printing thereupon. The print equipped with a laminated optical decoration having a top layer that can accept printing is able to be printed upon. In the print equipped with a laminated optical decoration having a top layer that can accept printing thereupon, both the laminated optical decoration and the print are able to be printed upon.

The lacquer layer 22 can have an irregular relief structure on one surface or both surfaces of the lacquer layer 22. The lacquer layer 22 can be made of a UV curable resin, a thermoplastic resin, or a thermosetting resin. The UV curable resin can be a curing resin such as monomers, oligomers, or a polymer having an ethylenically unsaturated bond or an ethylenically unsaturated group. The monomer having an ethylenically unsaturated bond or an ethylenically unsaturated group can be 1,6-hexanediol, neopentyl glycol diacrylate, trimethylolpropane triacrylate, pentaerythritol triacrylate, pentaerythritol tetraacrylate, dipentaerythritol pentaacrylate, and dipentaerythritol hexaacrylate. The oligomer having an ethylenically unsaturated bond or an ethylenically unsaturated group can be an epoxy acrylate, urethane acrylate, or a polyester acrylate oligomer or co-oligomer. The polymer can be a urethane-modified acrylic, or epoxy-modified acrylic polymer or copolymer. The UV curable resins can be any of an acrylic resin, an acrylic acrylate resin, an epoxy acrylate resin, a urethane acrylate resin, a polyester acrylate resin, and an ethylene methacrylate resin, any copolymer resin of the aforementioned resins, any composite resin of the aforementioned resins, and any composite resin of the copolymer resin. The lacquer layer 22 may be colored. It can be colored by adding a pigment or a dye to the resin of the lacquer layer 22. The pigment can be an inorganic pigment and an organic pigment. In addition, the pigments can be a fluorescent pigment, a pearl pigment, and a magnetic pigment. The dye can be a natural dye and a synthetic dye. In addition, the dye can be a fluorescent dye.

The thermoplastic resin of the lacquer layer 22 can be an acrylic resin, an epoxy resin, a cellulose resin, and a vinyl resin, any copolymer resin of the aforementioned resins, any composite resin of the aforementioned resins, and any composite resin of the aforementioned copolymer resins. The thermosetting resin of the lacquer layer 22 can be a urethane resin, a melamine resin, an epoxy resin, and a phenolic resin, any copolymer resin of the aforementioned resins, any composite resin of the aforementioned resins, and any composite resin of the copolymer resin. The thickness of the lacquer layer 22 can be in a range of 0.5 μm or more and 30 μm or less.

The relief structure of the lacquer layer 22 has a concave part or a convex part, or a concave part and a convex part. The relief structure has optical properties such as optical diffraction, optical reflection suppression, isotropic or anisotropic scattering, reflection, polarization selectivity, and wavelength selectivity. The optical effect of the relief structure can be detected through visual inspection, machine detection, or the like. Optical properties of the relief structure exhibit effects of forgery tampering prevention or improving design properties. The optical properties can be selected by combining reliefs having one or a plurality of optical effects.

According to the relief structure of the surface of the lacquer layer 22, the laminated optical structure 20 has optical functions such as diffraction, optical reflection suppression, isotropic or anisotropic light scattering, refraction, polarization and wavelength selective reflection, and transmission, and optical reflection suppression. When an area of a diffraction grating structure is provided as the relief structure of the lacquer layer 22, the laminated optical structure 20 can obtain a light diffracting property according to the relief structure. The pitch of the diffraction grating structure can be in a range of 0.5 μm or more and 2 μm or less. The depth of the diffraction grating structure may be in a range of 0.05 μm or more and 0.5 μm or less. When a moth-eye structure or a deep lattice structure is provided on the lacquer layer 22, the laminated optical structure 20 can obtain optical reflection suppression properties, polarization and wavelength selective reflection, transmission, and optical reflection suppression according to the relief structure. When an area of a scattering structure in which a plurality of linear portions or a plurality of dot-like portions are arranged non-periodically is provided on the lacquer layer 22, the laminated optical structure 20 can obtain a property of emitting isotropic or anisotropic scattering light according to the relief structure. The average pitch of the scattering structure can be 0.5 μm or more and 3 μm or less. The depth may be 0.05 μm or more and 0.5 μm or less. When an area of a mirror structure is provided on the lacquer layer 22 to have a different refractive index from an adjacent layer, the relief structure imparts a reflection property to the laminated optical structure 20. The average pitch of the mirror structures can be larger than 3 μm and 30 μm or less. The depth can be deeper than 0.5 μm and shallower than 20 μm. Optical properties of the laminated optical structure 20 can be perceived and detected through visual inspection or machine detection. Therefore, it is possible to improve forgery tampering prevention properties and design properties. The relief structure of the surface of the lacquer layer 22 may have a plurality of relief structure areas. One relief structure area or a plurality thereof in combination can display an image. The images can be a picture, a photo, a portrait, a landmark, a mark, a logo, a symbol, or a combination thereof.

An inorganic deposition layer 23 has a function of enabling the optical effect generated in the lacquer layer 22 to be easily observed.

The inorganic deposition layer 23 is formed on a part or the entire surface of the lacquer layer 22. When the inorganic deposition layer 23 is formed on a part of the lacquer layer 22, since a more advanced processing technique is required for producing the laminated optical structure 20 and a more elaborate design is provided, the hot-stamping foil 1 can have a stronger forgery prevention effect.

The inorganic deposition layer 23 enables the optical properties generated in the lacquer layer 22 to be easily observed. The inorganic deposition layer 23 may display structured colors. The structured color is, for example, a color due to interference. In some cases, the structured color varies depending on an observation angle or an illumination angle. Examples of structured colors include iridescent colors and high saturation color. A material of the inorganic deposition layer 23 can be individual metals or silicon, an alloy, and combinations thereof. The metals or silicon constituting a single substance, an alloy, or combinations thereof can be any of Si, Al, Sn, Cr, Ni, Cu, and Ag and any combination thereof. The thickness of the inorganic deposition layer 23 can be in a range of 10 to 500 nm. The inorganic deposition layer can be formed by depositing an inorganic material under a reduced pressure. The inorganic deposition layer 23 can be deposited by vacuum deposition, sputtering, or CVD.

The inorganic deposition layer 23 is a single layer or multiple layers. The multilayer inorganic deposition layer 23 can be formed by alternately laminating a metal alone and a metal compound, by alternately laminating different metals alone, or alternately laminating different metal compounds. The inorganic deposition layer 23 obtained by alternately laminating individual metals and a metal compound is, for example, multiple layers in which a silicon dioxide layer is laminated on an aluminum layer.

The coating layer 24 covers the entire surface or a part of the inorganic deposition layer 23. The coating layer 24 is provided as a resist on a part of the inorganic deposition layer 23, and the inorganic deposition layer 23 can be provided on a part of the lacquer layer 22 by selectively removing a part of the inorganic deposition layer 23 on which no coating layer is formed. When the inorganic deposition layer 23 is originally provided on a part of the lacquer layer 22, the coating layer 24 may be provided corresponding to the inorganic deposition layer.

When the coating layer 24 is printed, applied, and deposited on the inorganic deposition layer 23, the inorganic deposition layer 23 can be covered with the coating layer 24. Regarding a method of providing the coating layer 24 on a part of the inorganic deposition layer 23, a method in which the coating layer 24 is partially provided by printing, a method in which the coating layer 24 having a different permeability with respect to an etching solution is deposited on the inorganic deposition layer 23, and the coating layer 24 and the inorganic deposition layer 23 are selectively etched due to a difference in permeability with respect to the etching solution, a method in which a resin material that dissolves or is unlikely to be dissolved due to UV light exposure is applied, and after UV light is exposed in a pattern form, the coating layer 24 is developed, and the inorganic deposition layer 23 is selectively etched using an etching solution, or a method in which a soluble resin is partially formed on the inorganic deposition layer 23, the coating layer 24 is then formed, the soluble resin and the coating layer on the soluble resin are partially removed in a solvent can be used. Other various well-known processing techniques may be applied as long as the coating layer 24 is partially provided in the method.

A material of the coating layer 24 can be a resin, an inorganic material and a composite of a resin and an inorganic material. The resin of the coating layer 24 can be a resin having etching resistance. The resin of the coating layer 24 can be a curing resin. The curing resin easily obtains etching resistance. The resin of the coating layer 24 can be any of a vinyl resin, a polystyrene resin, an acrylic resin, a polyurethane resin, a polyamide resin, and a polyimide resin, any copolymer resin of the aforementioned resins, any composite resin of the aforementioned resins, and any composite resin of the aforementioned copolymer resin. The vinyl resins can be vinyl chloride, polyvinylidene chloride, and polyvinyl alcohol. The polystyrene resins can be polystyrene polystyrene, a styrene-acrylonitrile copolymer, polyethylene, and an ethylene vinyl acetate copolymer. The acrylic resins can be polymethyl methacrylate. In addition, resins obtained by copolymerizing at least two types or more thereof may be used. In addition, molecules of the resin may contain an ester bond, a urethane bond, an ether bond, an amine bond, a silanol bond, or the like. A part of a chemical structure of two or more types of resin having functional groups related to such bonds may be cross-linked. The curing resins can be a thermosetting resin such as a urethane resin and an epoxy resin, and a UV curable resin such as an acrylate resin. The resin of the coating layer 24 can be another electron beam curing resin and a moisture curing resin.

The thickness of the coating layer 24 can be in a range of 0.1 μm or more and 5 μm or less.

The sinking control layer 30 adjusts a sinking amount of spacer particles (to be described below) in the adhesive layer. During storage of the hot-stamping foil, spacer particles hardly sink into the sinking control layer, and when wound in a roll shape, maintain gaps between the adhesive layer and the carrier 10. During thermal transfer, spacer particles 41 appropriately sink into the sinking control layer. The sinking control layer 30 is in contact with the adhesive layer 40.

The sinking control layer 30 contains a soft resin and a deformation limiting agent. The soft resin and the deformation limiting agent may have different flexibilities. A mixing ratio between the soft resin and the deformation limiting agent can be in a range of 50:1 to 1:1. Due to thermal pressing, the soft resin in the sinking control layer 30 is deformed, and the spacer particles 41 sink. In this case, the deformation limiting agent limits deformation of the soft resin, and prevents the spacer particles 41 from excessively sinking, and thus adjusts sinking of the spacer particles 41. Accordingly, it is possible to prevent blocking due to excessive sinking, and white turbidity defects of the laminated optical structure 20 due to the spacer particles 41 not sinking.

The spacer particles 41 remain on the adhesive layer 40 because the sinking control layer 30 has an appropriate hardness before thermal pressing. In order to impart an appropriate hardness to the sinking control layer 30 before thermal pressing, the soft resin is made to be a crystalline resin, the deformation limiting agent is made to be a high glass transition temperature polymer or a composite thereof, or the above configurations may be used in combination. When the soft resin is a crystalline resin, since the soft resin is in a crystal state before thermal pressing, the sinking control layer 30 has an appropriate hardness. When the deformation limiting agent is a high glass transition temperature polymer or a composite thereof, since the deformation limiting agent is in a glass state before thermal pressing, the sinking control layer 30 has an appropriate hardness. When the above configurations are used in combination, since the soft resin is in a crystal state and the deformation limiting agent is in a glass state before thermal pressing, the sinking control layer 30 has an appropriate hardness.

The glass transition temperature of the soft resin of the sinking control layer 30 can be 80° C. or lower. The deformation limiting agents can be inorganic powder fillers having a particle size smaller than the thickness of the sinking control layer 30, a high glass transition temperature polymer, and both of inorganic powder fillers having a particle size smaller than the thickness of sinking control layer 30 and a high glass transition temperature polymer. The glass transition point of the high glass transition temperature polymer can be 60° C. or higher or the polymer may have no glass transition point. The glass transition point of the high glass transition temperature polymer may be in a range of 60° C. or higher and 300° C. or lower. The high glass transition temperature polymer may be a polymer powder filler.

When a high glass transition temperature polymer having a glass transition point of 60° C. or higher and a softening temperature of 90° C. or higher or 130° C. or lower is used as the deformation limiting agent of the sinking control layer 30, it is possible to prevent the occurrence of burrs when the laminated optical structure 20 is partially transferred to a transfer target. The high glass transition temperature polymer and the soft resin may have a phase separation structure in a 2-phase state. In order to form a phase separation structure in a 2-phase state, a dissolved coating solution using a soft resin soluble in a solvent and a high glass transition temperature polymer can be applied. The high glass transition temperature polymer can be in a continuous phase. The continuous phase forms a framework. Examples of continuous phases include a porous structure. The soft resin can be in a dispersion phase or a continuous phase. The glass transition temperature of the high glass transition temperature polymer may be equal to or higher than the glass transition temperature of the soft resin. As a result, it is thought that, during partial transfer, since the high glass transition temperature polymer is softened inside the contour of the thermal transfer area, but it is not softened outside the contour of the thermal transfer area, stress is concentrated on the high glass transition temperature polymer of the contour of the thermal transfer area, and the resin is reliably broken in the contour part.

The high glass transition temperature polymer as a powder or a dispersion may be mixed into the soft resin. In addition, the soft resin may be a crystalline resin. The high glass transition temperature polymer as a deformation limiting agent can be a vinyl chloride-vinyl acetate copolymer, a cellulose polymer, a phenol polymer, a fluorine polymer, a silicone polymer, an acrylic polymer, a melamine polymer, and an epoxy polymer. The vinyl chloride-vinyl acetate copolymer has favorable adhesion to other resins.

The soft resin of the sinking control layer 30 can be an acid-modified polyolefin resin. The acid-modified polyolefin resin may be a copolymer resin of ethylene and an acid component. The copolymers of ethylene and an acid component can be an ethylene(meth)acrylic acid copolymer resin (EMAA), an ethylene-acetic acid vinyl copolymer resin, and an ethylene(meth)acrylic acid ester copolymer resin. When the copolymer resin of ethylene and an acid component is used, appropriate flexibility and appropriate adhesion to an adjacent layer are easily obtained.

The acid-modified polyolefin resin can obtain adhesion to the adjacent inorganic deposition layer, the lacquer layer, and the coating layer due to acid modification. This is because the acid-modified polyolefin bonds with the adjacent inorganic deposition layer and the lacquer layer, and an organic silane compound and an isocyanate of the coating layer.

Among acid-modified polyolefins, an ethylene(meth) acrylic acid copolymer resin (EMAA) is not likely to cause the blocking. The soft resin in the sinking control layer 30 can have a lower softening temperature than a vinyl chloride-vinyl acetate copolymer in the sinking control layer 30, and additionally, can have a softening temperature that is equal to or lower than the transfer temperature during transfer. The softening temperature of the resin of the sinking control layer 30 can be in a range of 60° C. or higher and 110° C. or lower. Since the transfer temperature (stamper plate surface temperature) of the hot-stamping foil is generally in a range of 90° C. to 130° C., the softening temperature can be in the above range.

An acid value of the acid-modified polyolefin can be measured using a FT-IR method, a titration method, or the like which is generally used. The acid value of the acid-modified polyolefin can be in a range of 0.5 to 200.

Regarding a soft resin solution, a dispersion in which the soft resin is dispersed may be used. In this case, the dispersion particle size can be about 30 μm.

The soft resin and the vinyl chloride-vinyl acetate copolymer may have different flexibilities. Generally, the soft resin is more flexible than the vinyl chloride-vinyl acetate copolymer. The flexibility of each resin of the sinking control layer and the entire sinking control layer can be measured by a generally used nano indenter.

The softening temperature of the sinking control layer 30 can be in a range of 60° C. or higher and 110° C. or lower. Since the temperature during transfer of the hot-stamping foil is generally in a range of 90° C. to 130° C., the softening temperature of the sinking control layer 30 is a temperature at which softening occurs during the transfer.

An auxiliary agent may be added to the sinking control layer 30. An amount of the auxiliary agent added can be in a range of 0.1 Wt % to 10 Wt %. A silane coupling agent, or an isocyanate may be added as the auxiliary agent. When a silane coupling agent is added, even if a part of the sinking control layer 30 is in contact with the inorganic deposition layer 23 of the laminated optical structure 20, a silanol bond is generated, and thus stability of adhesion to the laminated optical structure 20 is improved. According to a silanol bond, the heat resistance and solvent resistance of the sinking control layer are also improved. In addition, when a part of the sinking control layer 30 is in contact with the lacquer layer 22 of the laminated optical structure 20, adhesion to a silane compound added to the lacquer layer 22 present on the surface of the lacquer layer 22 is also improved.

An isocyanate may be added as an auxiliary agent to the sinking control layer 30. When an isocyanate is added, a urethane bond is generated in a part of the sinking control layer 30 in contact with the lacquer layer 22 and the coating layer 24, and adhesion, heat resistance, solvent resistance, and the like are improved. The sinking control layer 30 may have fluorescence properties. Fluorescence properties can be realized when a resin or polymer has a fluorescent molecular structure, when a fluorescent agent is added to a resin, or when a resin or polymer has a fluorescent molecular structure and a fluorescent agent is added to the resin.

The thickness of the sinking control layer 30 can be in a range of 0.5 μm or more and 3 μm or less.

The adhesive layer 40 contains a resin component that exhibits adhesiveness with respect to an adherent, and spacer particles and powder fillers that are added to the resin component. The powder fillers are not essential. A content proportion (weight proportion) of the powder fillers in the adhesive layer 40 can be in a range of 0.1% or more and 100% or less of the resin component.

Various known adhesives, pressure-sensitive adhesives, and the like can be used as the resin component. An acrylic resin may be used as the resin component. The acrylic resins can be polymethyl methacrylate. When the hot-stamping foil 1 is applied to securities and the like, the material of the transfer target is likely to be paper, polypropylene, polyethylene, or the like. When the resin component is an acrylic resin, transfer can be performed with a small amount of heat, and transfer is performed by heat and pressure application for a short time in a transfer process for such a transfer target. Accordingly, the throughput of transfer is improved. In the transfer process according to the present invention, "heat and pressure application for a short time" refers to generally heat and pressure application at 90 to 130° C. for shorter than 1 second. Therefore, a thermoplastic resin having a melting point of 60° C. to 130° C. other than the acrylic resin can be used as the resin component of the adhesive layer 40. In this case, the transfer can be performed by heat and pressure application for a shorter time.

Examples a suitable thermoplastic resin other than an acrylic resin include a vinyl resin, a polystyrene resin, and a polyurethane resin. The vinyl resins can be vinyl chloride, polyvinylidene chloride, and polyvinyl alcohol. The polystyrene resins can be a polystyrene, a styrene-acrylonitrile copolymer, a polyethylene, and an ethylene vinyl acetate copolymer, and resins obtained by copolymerizing two or more thereof. In addition, an ester bond, a urethane bond, an ether bond, an amine bond, a silanol bond or the like may be contained in the resin. A part of a chemical structure of two or more types of resin having functional groups related to such bonds may be cross-linked. A molecular weight can be adjusted according to such a bond, and the softening temperature, viscoelasticity, solvent resistance, and the like can be adjusted. In addition, the thermoplastic resin may be a copolymer. In addition, the thermoplastic resin may be modified. The adhesive layer 40 may have fluorescence properties. Fluorescence properties can be realized when a resin or polymer has a fluorescent molecular structure, when a fluorescent agent is added to a resin, or when a resin or polymer has a fluorescent molecular structure and a fluorescent agent is added to the resin.

The thickness of the adhesive layer 40 defined by the resin component can be thicker than the sinking control layer 30. The thickness of the adhesive layer 40 can be in a range of 2 μm or more and 10 μm or less.

The spacer particles 41 have an average particle size that is larger than the thickness of the adhesive layer 40. In addition, the average particle size of the spacer particles 41 can be larger than the total thickness of the adhesive layer 40 and the sinking control layer 30, and be equal to or smaller than twice the total thickness. The average particle size of the spacer particles 41 can be in a range of 1 or more and 10 μm or less. In the present invention, the average particle size of particles can be measured using a laser diffraction and scattering type particle size distribution measuring device (Microtrac BlueRaytrac commercially available from Microtrac Bel Corp) before application, and refers to the volume average particle size. After application, it can be obtained from an area average particle size from an observation image taken by an electronic microscope.

Regarding the spacer particles, particle groups with two average particle sizes may be blended. In this case, the average particle size of small spacer particles may be in a range of 1 to 10 μm, and the average particle size of large spacer particles may be in a range of 10 μm or more to 30 μm. When particle groups with two average particle sizes are blended, a volume proportion of the particle group of large spacer particles can be larger than a volume proportion of small spacer particles. A volume ratio between the particle group of large spacer particles and the particle group of small spacer particles can be 1:50 or more and 1:2 or less. In addition, the spacer particles 41 may be formed by blending particle groups of two or more average particle sizes.

The spacer particles 41 can be shaped particles or irregular particles. The shaped particles can be elliptical particles and spherical particles. Fixed form particles tend to maintain stable gaps. Elliptical particles are robust against pressure. In spherical particles, a certain response is obtained with respect to pressure. In the case of irregular particles, costs can be reduced. In addition, regarding a dispersion state for the particle size, a monodispersion with a uniform particle size is preferably used. The monodispersion in the present invention generally refers to a CV value=(standard deviation/average value) being 10% or less.

The spacer particles 41 can be made of an inorganic material, a heat-resistant resin, a composite of an inorganic material and a heat-resistant resin, or a natural material. The inorganic materials can be an inorganic compound and a pure substance. The inorganic compounds can be silica, calcium carbonate, talc, barium sulfate, mica, aluminum hydroxide, magnesium hydroxide, kaolin clay, zeolite, and mica. The pure substances can be carbon black. The heat-resistant resin as a material of the spacer particles 41 is a synthetic resin. The synthetic resins can be an acrylic resin, a urethane resin, a polyethylene resin, and a polypropylene resin. The natural materials can be wood powder and amber. In addition, regarding the composite of the inorganic material and the heat-resistant resin of the spacer particles 41, the above mentioned materials can be used as the inorganic material or the heat-resistant resin. In the case of the inorganic material, heat resistance and chemical resistance are easily obtained. In the case of the synthetic resin, heat resistance and chemical resistance are easily obtained. In the case of the natural material, an environmental load is low.

A volume proportion of the spacer particles 41 with respect to the resin component of the adhesive layer 40 can be in a range of 0.1% or more and 3% or less.

The powder fillers are powder particles having a nano level average particle size. Regarding a material of inorganic powder fillers, silica, various metals, oxides thereof and the like can be used. Inorganic powder fillers do not deteriorate in a solvent. In addition, inorganic powder fillers are cheap. The heat-resistant resin powder fillers are powder particles having a nano level average particle size. The heat-resistant resin as a material of the heat-resistant resin powder filler is a synthetic resin. The synthetic resins can be an acrylic resin, a urethane resin, a polyethylene resin, and a polypropylene resin. Natural materials can be cellulose, amber, zeolite, and mica. In the case of the synthetic resin, heat resistance and chemical resistance are easily obtained. In the case of the natural material, an environmental load is low.

The average particle size of the inorganic powder fillers and the heat-resistant resin powder fillers can be 10 to 15 nanometers (nm). The average particle size of the inorganic powder fillers and the heat-resistant resin powder filler may be smaller than the thickness of the adhesive layer 40. The average particle size of a nano level filler in the present disclosure can be measured using a dynamic light scattering type particle size distribution measuring device (Nanotrac Wave commercially available from Microtrac Bel Corp) before application and refers to the volume average particle size. After application, it can be obtained from an area average particle size from an observation image using an electronic microscope.

The inorganic powder fillers and the heat-resistant resin powder fillers can be irregular particles. In addition, regarding a dispersion in the particle size of the inorganic powder fillers, a poly-dispersion with a non-uniform particle size is preferably used. The poly-dispersion in the present invention refers to a CV value=(standard deviation/average value) being 10% or more.

In this specification, the thickness of the adhesive layer 40 is defined by the thickness of the resin component in the adhesive layer 40. The thickness of the adhesive layer 40 can be measured using a scanning electronic microscope. The number of measurement points practically needs to be 5 points, but it can be 30 points precisely, and the average value of measured measurement values can be set as the thickness. In addition, measurement may be performed similarly using an optical microscope. The thicknesses of the other layers in the hot-stamping foil 1 can also be measured using a scanning electronic microscope. The number of measurement points in this case practically needs to be 5 points, but it can be 30 points precisely, and the average value of measured measurement values can be set as the thickness. In addition, measurement may be performed similarly using an optical microscope.

The adhesive layer 40 may contain a polymer having a glass transition point of 60° C. or higher in addition to the above thermoplastic resin, spacer particles and powder fillers. The glass transition point of the polymer can be 60° C. or higher and 150° C. or lower. Regarding the polymer, one type of resin may be used or a mixture of a plurality of resins may be used. Regarding the resin, a thermoplastic resin and a curing resin can be used. Regarding the polymer, a polymer containing one type of monomer or a copolymer can be used. The polymer containing one type of monomer can be acrylic, polyurethane, polyvinyl chloride, polyvinyl acetate, and polystyrene. Regarding the copolymer, a vinyl chloride-vinyl acetate copolymer and the like can be used. In addition, the polymer may contain a low-molecular-weight resin such as a terpene resin, a rosin resin, and a styrene-maleic acid resin. A ratio between the thermoplastic resin of the resin component and the polymer having a glass transition point of 60° C. or higher can be in a range of 50:1 to 5:1 or a range of 40:1 to 6:1.

The adhesive layer 40 may contain break promoting particles. When a transfer body including the laminated optical structure 20, the sinking control layer 30, and the adhesive layer 40 is thermally transferred from the hot-stamping foil 1 to a transfer target, the break promoting particles cause the transfer body to break at the boundary between a transfer area and the other area. When breakage is insufficient, and the transfer body is extended to the outside of the transfer area, resin debris is generated from the extended part. The break promoting particles can be particles having the same material, the same shape, and the same CV value as the spacer particles, and having a particle size smaller than a total thickness of the adhesive layer and the sinking control layer.

The adhesive layer 40 can be formed by applying a coating solution containing a resin component and spacer particles. In the coating solution, a solid content may be completely dissolved, and a solid content may be dispersed as in a dispersion or an emulsion. Application can be performed by roll coating, reverse roll coating, gravure coating, reverse gravure coating, bar coating, rod coating, lip coating, die coating or the like. In addition, printing may be applied to application. The printing can be gravure printing and screen printing. The coating solution is preferably dried at a temperature equal to or lower than the melting point of the solid content.

The transfer target can be a print. The print can be a film or printed paper of which the entire surface or a part is printed, and a film or printing paper to be printed. The thickness of the print can be in a range of 0.05 mm or more and 4 mm or less. The entire surface or a part of the surface of a base film is coated with an anchor layer, and the printed film is printed on the coated anchor layer. High quality paper, medium quality paper, coated paper, uncoated paper, film-laminated paper, resin-impregnated paper, or the like can be used in the printed paper. A film to be printed is a plastic film coated with an anchor layer so that printing is accepted on a base film. A plastic film can be applied to a printed film, and a base film of the film to be printed. The plastic film can be an extended film and a non-extended film. The extended film and the non-extended film can be a polyester film, a polycarbonate film, a polyethylene film, and a polypropylene film. The polymer film can have a single layer or multiple layers in which the same materials or different materials are alternately laminated. The printing can be gravure printing, offset printing, and screen printing. In printing, an ink can be printed. The ink can be a pigment ink, a dye ink, a pearl ink, and an invisible ink. The invisible inks can be a fluorescent ink and an infrared absorption ink. The print as the transfer target can be a security print. The security prints can be banknotes, tickets, tags, stickers, game cards, authentication cards, authentication pages, gift certificates, certificates, posters, greeting cards, and business cards. The security print is printing that requires a measure for preventing abuse such as forgery, tampering, and theft of information that is meant to be kept secret, a measure for easily determining whether abuse has occurred when there is concern of such abuse, or a measure for preventing forgery. The anchor layer used for the polymer film able to be printed upon or printed polymer film can be made of a thermoplastic resin, a thermosetting resin, or a thermoplastic thermosetting resin. The resin of the anchor layer can be a polymer and a copolymer. The polymer and the copolymer of the anchor layer can be polyethylene, ethylene methacrylic acid, polyethyleneimine, and polyurethane. According to bonding of the + polar group or the − polar group of polyethyleneimine with the + polar group or the − polar group of the ethylene (meth)acrylic acid copolymer, high adhesiveness with respect to the laminated optical decoration 25 is provided. In addition, the surface of the transfer target can be modified according to a known surface modification treatment. The surface modification treatment of the transfer target provides high adhesiveness with respect to the hot-stamping foil 1. The surface modification treatment can be a corona discharge treatment, a flame treatment, an ozone treatment, a UV light treatment, a radiation treatment, a roughening treatment, a chemical treatment, a plasma treatment, a low temperature plasma treatment and a grafting treatment. The transfer target has strong adhesion to the hot-stamping foil 1. The hot-stamping foil 1 is transferred such that the adhesive layer 40 comes in contact with the transfer target, and after the transfer, the carrier 10 is removed. A laminated optical structure or a print of a transfer target, or both a laminated optical structure and a print of a transfer target are able to be printed upon. After the laminated optical structure is thermally transferred from the hot-stamping foil to the transfer target, printing can be performed on the laminated optical structure, the print of the transfer target, or both the laminated optical structure and the print of the transfer target. A laminated optical structure can be thermally transferred to the print using a hot-stamping foil to obtain a print equipped with a laminated optical structure. For preventing forgery of tickets, banknotes, cards, books, posters, and the like, when the laminated optical structure is thermally transferred to generally expensive branded goods, luxury goods, and the like, a print equipped with a laminated optical structure that can prove its authenticity can be obtained. The hot-stamping foil can effectively satisfy such requirements and visual effects having excellent design properties are obtained. The hot-stamping foil 1 can be thermally transferred to the print.

Figure 10:
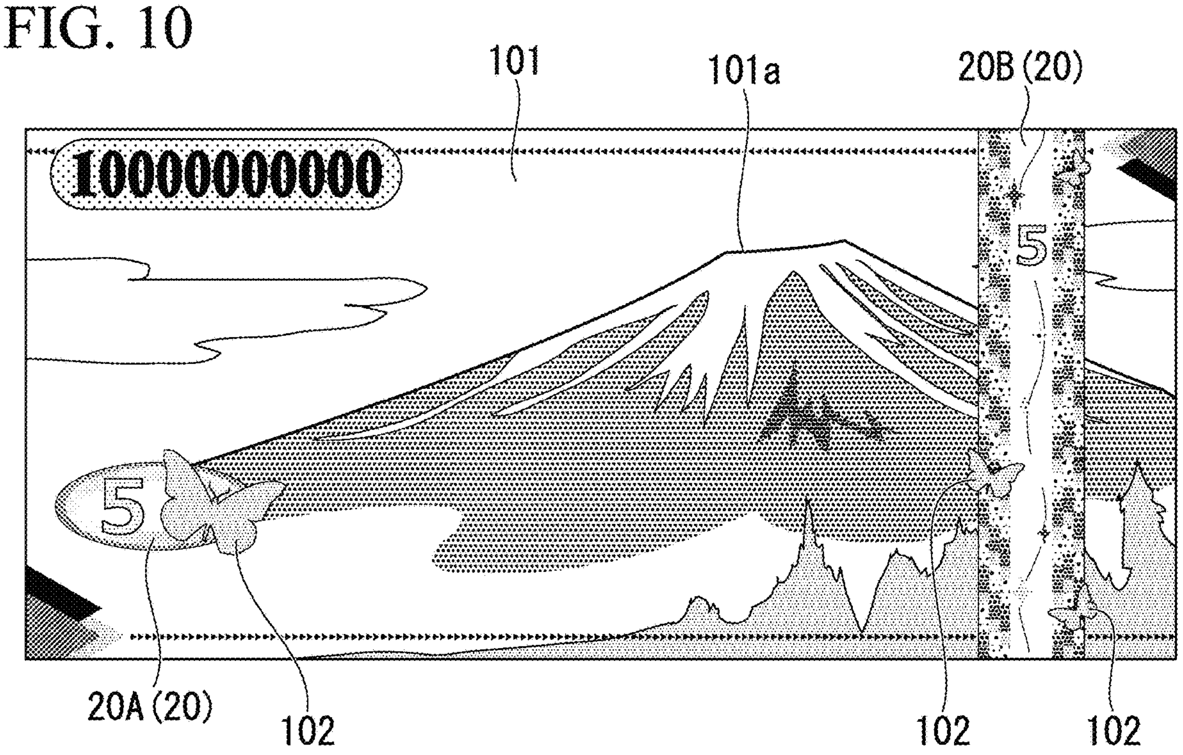
FIG. 10 is a plan view showing an example of a print equipped with a laminated optical decoration.
Figure 11:
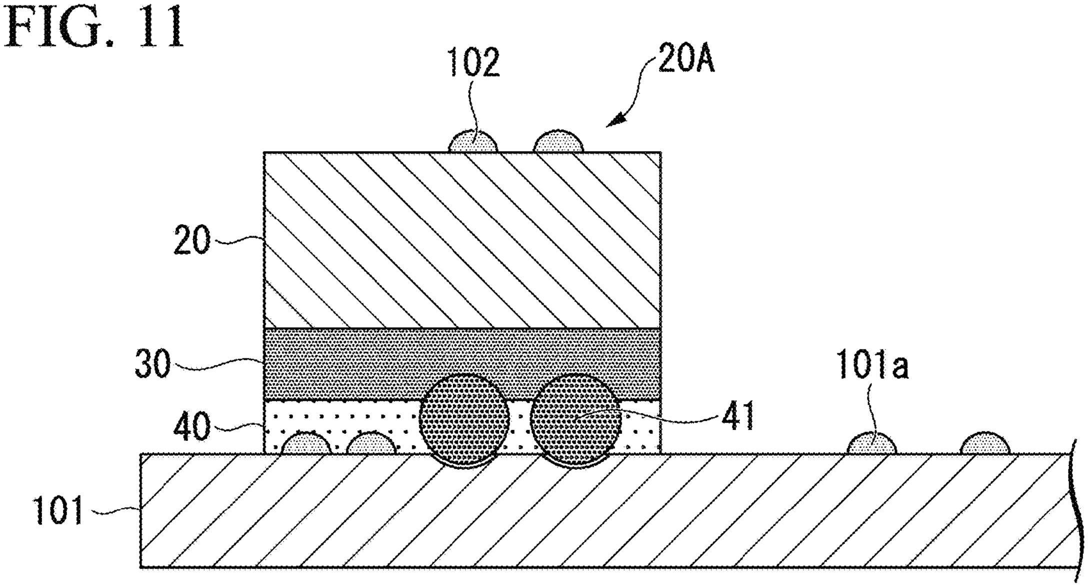
FIG. 11 is a cross-sectional view schematically showing a part of the print equipped with a laminated optical decoration.

FIG. 10 and FIG. 11 show examples of a print equipped with a laminated optical decoration. A print equipped with a laminated optical decoration 100 shown in a plan view in FIG. 10 includes a banknote (print) 101 as a transfer target on which printing 101*a* is performed and the laminated optical decoration 25 of the hot-stamping foil 1 transferred to the banknote 101. Although two types of laminated optical decoration including a patch-shaped laminated optical decoration 25A and a stripe-shaped laminated optical decoration 25B are transferred to the banknote 101, these are only examples, and only one of them may be used.

FIG. 11 is a cross-sectional view schematically showing a part in FIG. 10. The laminated optical decoration 25A is bonded to the banknote 101 via the adhesive layer 40. The spacer particles 41 in the adhesive layer 40 sink into the sinking control layer 30. In the laminated optical decoration 25A, printing 102 is formed on the lower surface of the adhesive layer 40 and the upper surface of the laminated optical decoration 25A. Printing can be performed on any side of the laminated optical decoration.

When the hot-stamping foil 1 is industrially mass-produced, the laminated optical structure 20, an anchor layer 30, and the adhesive layer 40 are formed on the long carrier 10, and thereby the hot-stamping foils 1 are produced in a state where there carriers 10 are connected to each other. Generally, the hot-stamping foils 1 produced in this manner that is wound in a roll shape is stored until it is transferred to the transfer target.

Blocking is a problem generated during storage of the hot-stamping foil. The blocking is a phenomenon in which hot-stamping foils adhere to each other mainly during storage, and if blocking occurs, when the hot-stamping foil wound in a roll shape is unwound, the top layer is released from the carrier, and a part or all of the laminated optical structure remains on the carrier positioned on the lower side (a part which is wound further inside). As a result, a hot-stamping foil in which blocking occurred is defective.

In the hot-stamping foil 1 of the present embodiment, since spacer particles are mixed into the adhesive layer 40, it is possible to prevent blocking. Details will be described below.

Figure 2:
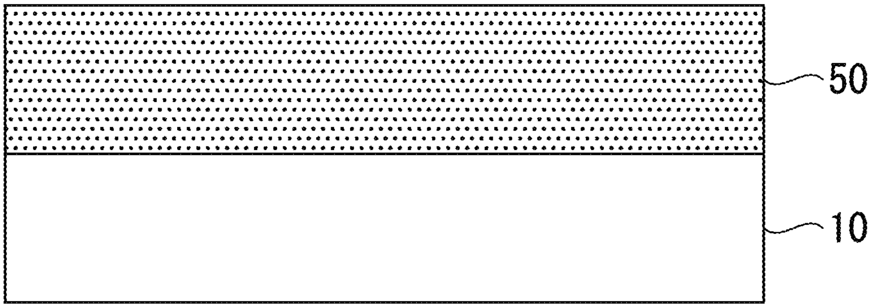
FIG. 2 schematically illustrates contact of an adhesive layer not containing particles and a carrier.

As shown in FIG. 2, in an adhesive layer 50 containing no spacer particles, since a resin component having adhesiveness is in contact with the lower carrier 10 over the entire surface, blocking is likely to occur. When spacer particles having a particle size larger than the thickness of the resin component are added in the adhesive layer, since a portion of the spacer particles protrudes onto the adhesive layer, a contact area between the resin component of the adhesive layer and the carrier 10 is reduced.

Figure 3:
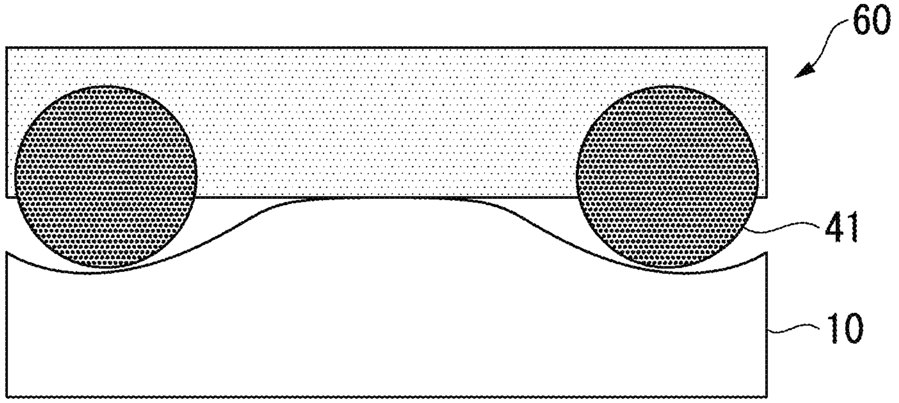
FIG. 3 is a diagram schematically showing a contact mode between an adhesive layer containing only spacer particles and a carrier.

FIG. 3 shows an adhesive layer 60 containing only spacer particles 41. When a portion of the spacer particles 41 protrudes, a contact area between a resin component 61 of the adhesive layer 60 and the carrier 10 is reduced. However, in an area between the spacer particles 41, since the resin component 61 and the carrier 10 are still in contact with each other over the entire surface, a blocking prevention effect may not be sufficient.

Figure 4:
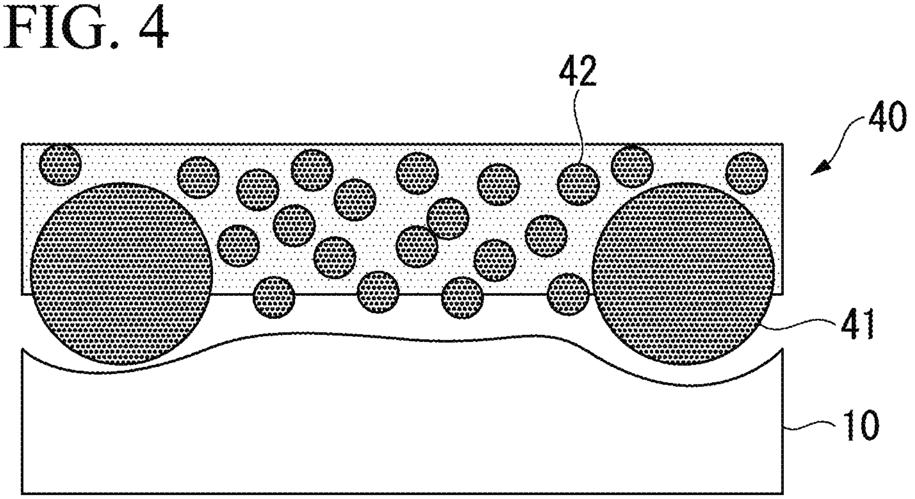
FIG. 4 is a diagram schematically showing a contact mode between an adhesive layer containing spacer particles and powder fillers, and a carrier.

FIG. 4 shows the adhesive layer 40 of the present embodiment containing spacer particles 41 and powder fillers 42. While the powder fillers 42 have a smaller particle size than the thickness of the adhesive layer 40, since they are present in a larger amount than the spacer particles 41, in an area between the spacer particles 41, the surfaces of some of the powder fillers 42 protrude onto a resin component 45, and thus the resin component 45 and the carrier 10 are prevented from being in contact with each other over the entire surface. Therefore, the hot-stamping foil 1 of the present embodiment can suitably prevent the occurrence of blocking without excessively increasing white turbidity.

In order to exhibit the above effects, in a total weight of the spacer particles 41 and the powder fillers 42, it is necessary to make a proportion of the powder fillers larger than that of the spacer particles. Specifically, a weight ratio between spacer particles and powder fillers is preferably 1:20 to 1:100 and more preferably 1:30 to 1:50.

White turbidity is another problem generated in the hot-stamping foil 1. As described above, white turbidity occurs when irregularities are generated on the surface of the laminated optical structure 20, and light emitted to the laminated optical structure 20 is scattered. Spacer particles added to the adhesive layer may cause irregularities on the surface of the laminated optical structure 20.

In the related art, in the anchor layer in the hot-stamping foil, a vinyl chloride-vinyl acetate copolymer having favorable adhesion to both of the resin and the inorganic material is used in many cases. However, since the vinyl chloride-vinyl acetate copolymer is a resin having poor flexibility, spacer particles may penetrate through the anchor layer during transfer in combination with the adhesive layer to which spacer particles are added. When the rigid spacer particles that have penetrated through the anchor layer deform the laminated optical structure, irregularities are generated on the surface of the laminated optical structure 20, which causes white turbidity.

As described above, in order to prevent white turbidity, it is preferable that a layer corresponding to the conventional anchor layer have a certain degree of flexibility, and when it is too flexible, spacer particles are excessively embedded into the anchor layer, and the blocking prevention effect cannot be sufficiently exhibited.

The inventors conducted repeated examinations for achieving both the blocking prevention effect and the white turbidity prevention effect, and as a result, found that, when a sinking control layer containing a soft resin and a deformation limiting agent is provided between the laminated optical structure and the adhesive layer, it is effective to set a sinking amount of spacer particles during thermal pressing to a predetermined range.

Figure 5:
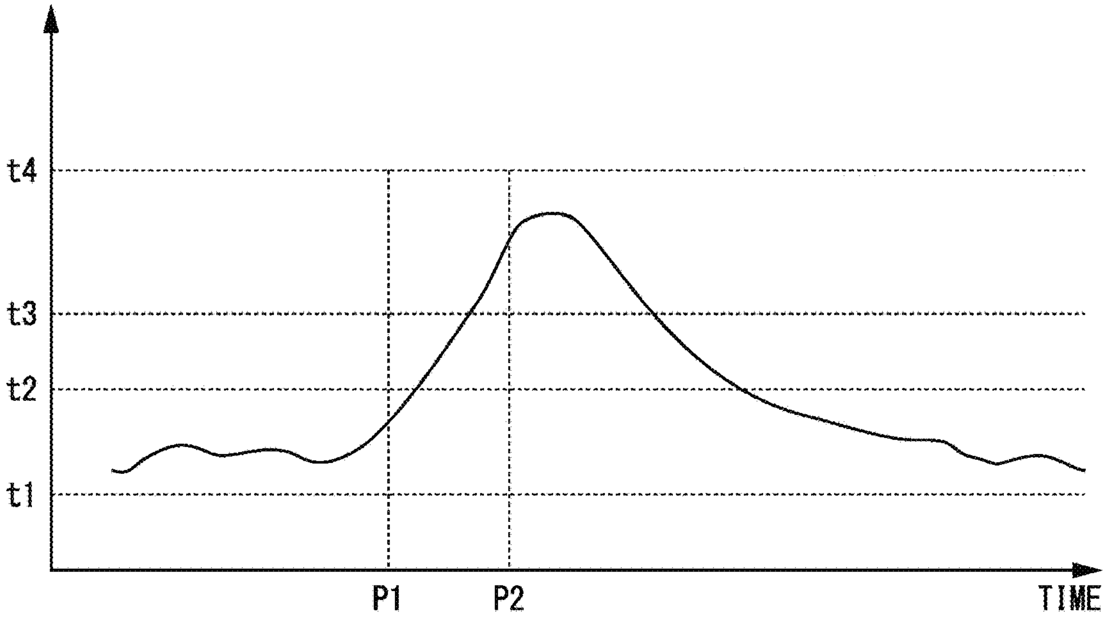
FIG. 5 is a conceptual diagram showing change in the temperature of the hot-stamping foil.

FIG. 5 is a conceptual diagram showing change in the temperature of the hot-stamping foil 1. During storage when the temperature t is t1 to t2 shown in FIG. 5, since neither a soft resin nor a deformation limiting agent softens, blocking is suitably prevented by the spacer particles 41. When transfer starts at the time P1, the temperature of the hot-stamping foil 1 rapidly rises to a temperature close to the transfer temperature t4 in approximately 1 second until the time P2 at which transfer is completed. In an initial stage of transfer in which the temperature t is t2 to t3 shown in FIG. 5, the soft resin softens, but the deformation limiting agent does not soften. Then, when the temperature t reaches a later stage of transfer exceeding t3 shown in FIG. 5, the deformation limiting agent softens, and the spacer particles 41 can sink into the sinking control layer 30. As a result, movement of the spacer particles 41 is suitably absorbed by the sinking control layer 30, and the occurrence of white turbidity is suitably prevented.

If the flexibility of the sinking control layer 30 is not sufficient when thermal pressing is applied to the hot-stamping foil, the sinking control layer 30 hardly deforms when pressed by spacer particles, the spacer particles do not sink into the sinking control layer 30. As a result, an amount of the spacer particles 41 protruding from the resin component hardly transforms before and after a thermal pressing load is applied. Since a maximum size of the adhesive layer 40 in the thickness direction is defined exclusively by an amount of spacer particles protruded, in this case, the total thickness of the hot-stamping foil does not change much before and after a thermal pressing load is applied.

On the other hand, when the sinking control layer 30 is sufficiently flexible during thermal pressing, a part of the sinking control layer 30 is pushed by the spacer particles 41 and deforms, and some of the spacer particles 41 sink into the sinking control layer 30. As a result, an amount of the spacer particles 41 protruding from the resin component after a thermal pressing load is applied is reduced according to the amount of sinking. Accordingly, the total thickness of the hot-stamping foil also decreases after a thermal pressing load is applied. Therefore, when a difference in the total thickness of the hot-stamping foil before and after thermal pressing is measured, it is possible to determine a sinking amount of spacer particles during thermal pressing.

In examinations performed by the inventors, it is confirmed that, when a sinking amount of spacer particles during transfer thermal pressing is set in a range of 20% or more and 60% or less of a sinking amount of spacer particles during overload thermal pressing, it is possible to maximize both the blocking prevention effect and the white turbidity prevention effect. This is a new finding that the inventors discovered. Here, in this case, powder fillers are not necessarily essential, and the adhesive layer may contain only spacer particles.

Regarding thermal pressure conditions for measuring a sinking amount of fillers, thermal pressure conditions may be set at a temperature of 40° C. to 80° C. in which a situation in a warehouse during storage is simulated, and a load range to be 1 to 4 kg in which a load according to a hot-stamping foil in a wound state during storage is simulated. Particularly, evaluation can be performed with a load of 2 kg at 60° C. This is set in consideration of most severe conditions during storage.

As described above, according to the configuration of the sinking control layer 30 and the adhesive layer 40, the hot-stamping foil 1 can make realize both prevention of blocking and prevention of white turbidity defects which are difficult in the related art.

EXAMPLES

The hot-stamping foil of the present embodiment will be described in further detail with reference to examples and comparative examples. However, the technical scope of the present invention is not limited to specific content of such examples.

Example 1

First, materials of respective layers will be shown. In the following description, "parts" refers to parts by mass unless otherwise specified.

(Carrier)

PET film (with a thickness of 38 μm) (product name Lumirror commercially available from Toray Industries, Inc.)

(Ink for Forming a Top Layer)

| | |
|---|---|
| polyamide imide resin | 19.2 parts |
| polyethylene powder | 0.8 parts |
| dimethylacetamide | 45.0 parts |
| toluene | 35.0 parts |

(Ink for Forming a Lacquer Layer)

| | |
|---|---|
| urethane resin | 20.0 parts |
| methyl ethyl ketone | 50.0 parts |
| ethyl acetate | 30.0 parts |

(Ink for Forming a Coating Layer)

| | |
|---|---|
| vinyl chloride-vinyl acetate copolymer | 65.6 parts |
| polyethylene resin | 2.9 parts |
| polyurethane resin | 8.2 parts |
| dimethylacetamide (DMAC) | 23.3 parts |

(Ink A for Forming a Sinking Control Layer)

| | |
|---|---|
| EMAA (dispersion, softening temperature of 62° C.) | 47.8 parts |
| vinyl chloride-vinyl acetate copolymer (E15/45M commercially available from Tomoe Engineering Co., Ltd. tg 73° C.) | 7.1 parts |
| organic silane compound (silane coupling agent) | 2.4 parts |
| isocyanate | 1.4 parts |
| ethanol | 11.9 parts |
| methyl ethyl ketone | 15.4 parts |
| toluene | 14.0 parts |

(Ink A for Forming an Adhesive Layer)

| | |
|---|---|
| acrylic resin (resin component) | 36.9 parts |
| polyester resin (resin component) | 0.9 parts |
| anti-foaming agent | 0.2 parts |
| silica (spacer particles with an average particle size of 8.0 μm, measured using a laser method) | 1.1 parts |
| nano silica (inorganic powder fillers with an average particle size of 10 to 15 nm, measured using a laser method) | 50.1 parts |
| methyl ethyl ketone | 9.4 parts |
| toluene | 1.5 parts |

A method of producing a hot-stamping foil will be described below. The ink for forming a top layer was applied to one surface of a carrier and dried so that the film thickness after drying (dry film thickness) was 1 μm, and thereby a top layer was formed.

Next, the ink for forming a lacquer layer was applied to the top layer and dried so that the dry film thickness was 1 μm, and then a relief structure constituting a diffraction grating was formed on a surface of a lacquer layer using a roll embossing method.

Subsequently, vacuum-deposition was performed on the lacquer layer so that aluminum had a film thickness of 50 nm to form an inorganic deposition layer.

Subsequently, the ink for forming a coating layer was applied to the inorganic deposition layer and dried so that the dry film thickness was 1 μm, and thereby a coating layer was formed.

Accordingly, a laminated optical structure was formed on the carrier.

Then, the ink A for forming a sinking control layer was applied to the laminated optical structure and dried so that the dry film thickness was 1 to 2 μm, and thereby a sinking control layer was formed.

In addition, the ink A for forming an adhesive layer was applied to the sinking control layer and dried so that the dry film thickness of the solid content was 4 to 5 μm, and thereby an adhesive layer was formed.

Thereby, a hot-stamping foil of Example 1 was produced.

Example 2

A hot-stamping foil of Example 2 was produced in the same method as in Example 1 except that the following ink B for forming a sinking control layer was used in place of the ink A for forming a sinking control layer.

(Ink B for Forming a Sinking Control Layer)

| | |
|---|---|
| polyester urethane resin (UR-8200 commercially available from Toyobo Co., Ltd. tg 73° C.) | 31 parts |
| vinyl chloride-vinyl acetate copolymer (E15/45M) | 13.8 parts |
| methyl ethyl ketone | 27.6 parts |
| toluene | 27.6 parts |

Example 3

A hot-stamping foil of Example 3 was produced in the same method as in Example 1 except that the following ink C for forming a sinking control layer was used in place of the ink A for forming a sinking control layer.

(Ink C for Forming a Sinking Control Layer)

| | |
|---|---|
| polyester urethane resin (UR-8300 commercially available from Toyobo Co., Ltd. tg 23° C.) | 31 parts |
| vinyl chloride-vinyl acetate copolymer (E15/45M) | 13.8 parts |
| methyl ethyl ketone | 27.6 parts |
| toluene | 27.6 parts |

Example 4

A hot-stamping foil of Example 4 was produced in the same method as in Example 1 except that the following ink D for forming a sinking control layer was used in place of the ink A for forming a sinking control layer.

(Ink D for Forming a Sinking Control Layer)

| | |
|---|---|
| polyester urethane resin (UR-8700 commercially available from Toyobo Co., Ltd. tg 22° C.) | 31 parts |
| vinyl chloride-vinyl acetate copolymer (E15/45M) | 13.8 parts |
| methyl ethyl ketone | 27.6 parts |
| toluene | 27.6 parts |

Example 5

A hot-stamping foil of Example 5 was produced in the same method as in Example 1 except that the following ink E for forming a sinking control layer was used in place of the ink A for forming a sinking control layer.

(Ink E for Forming a Sinking Control Layer)

| | |
|---|---|
| EMAA (dispersion (with an average particle size of 30 μm), softening point of 62° C.) | 57 parts |
| vinyl chloride-vinyl acetate copolymer (E15/45M) | 8.6 parts |
| methyl ethyl ketone | 17.2 parts |
| toluene | 17.2 parts |

Example 6

A hot-stamping foil of Example 6 was produced in the same method as in Example 1 except that the following ink F for forming a sinking control layer was used in place of the ink A for forming a sinking control layer.

(Ink F for Forming a Sinking Control Layer)

| | |
|---|---|
| crystalline polyester (dispersion, Tg −14° C.) | 40 parts |
| vinyl chloride-vinyl acetate copolymer (E15/45M) | 12 parts |
| methyl ethyl ketone | 24 parts |
| toluene | 24 parts |

Example 7

A hot-stamping foil of Example 7 was produced in the same method as in Example 1 except that the following ink G for forming a sinking control layer was used in place of the ink A for forming a sinking control layer.

(Ink G for Forming a Sinking Control Layer)

| | |
|---|---|
| polyamide elastomer (softening temperature of 142 ± 5° C.) | 8 parts |
| vinyl chloride-vinyl acetate copolymer (E15/45M) | 12 parts |
| methyl ethyl ketone | 40 parts |
| toluene | 40 parts |

Example 8

A hot-stamping foil of Example 8 was produced in the same method as in Example 1 except that the following ink H for forming a sinking control layer was used in place of the ink A for forming a sinking control layer.

(Ink H for Forming a Sinking Control Layer)

| | |
|---|---|
| polyamide elastomer (TPAE-12 commercially available from T&K TOKA) | 8 parts |
| vinyl chloride-vinyl acetate copolymer (E15/45M) | 12 parts |
| methyl ethyl ketone | 40 parts |
| toluene | 40 parts |

Example 9

A hot-stamping foil of Example 9 was produced in the same method as in Example 1 except that the following ink I for forming a sinking control layer was used in place of the ink A for forming a sinking control layer.

(Ink E for Forming a Sinking Control Layer)

| | |
|---|---|
| polyamide elastomer (TPAE-31 commercially available from T&K TOKA melting point of 114° C.) | 5.7 parts |
| vinyl chloride-vinyl acetate copolymer (E15/45M) | 8.6 parts |
| methyl ethyl ketone | 17.2 parts |
| toluene | 42.85 parts |
| ethanol | 25.65 parts |

Example 10

A hot-stamping foil of Example 10 was produced in the same method as in Example 1 except that the following ink J for forming a sinking control layer was used in place of the ink A for forming a sinking control layer.

(Ink J for Forming a Sinking Control Layer)

| | |
|---|---|
| EMAA (dispersion, softening temperature of 62° C.) | 57 parts |
| cellulose acetate propionate (CAP-504-0.2 commercially | 8.6 parts |

-continued

| | |
|---|---|
| available from Eastman Chemical Company, tg 159° C.) | |
| ethanol | 17.2 parts |
| toluene | 17.2 parts |

Example 11

A hot-stamping foil of Example 11 was produced in the same method as in Example 1 except that the following ink K for forming a sinking control layer was used in place of the ink A for forming a sinking control layer.

(Ink K for Forming a Sinking Control Layer)

| | |
|---|---|
| EMAA (dispersion, softening temperature of 62° C.) | 57 parts |
| terpene phenol resin (YS polystar T160 commercially available from Yasuhara Chemical Co., Ltd. softening point of 160 ± 5° C.) | 8.6 parts |
| methyl ethyl ketone | 34.4 parts |

Example 12

A hot-stamping foil of Example 12 was produced in the same method as in Example 1 except that the following ink L for forming a sinking control layer was used in place of the ink A for forming a sinking control layer.

(Ink L for Forming a Sinking Control Layer)

| | |
|---|---|
| acrylic resin (BPS6458 commercially available from Toyo Ink Co., Ltd. tg −37° C.) | 61.6 parts |
| vinyl chloride-vinyl acetate copolymer (Solbin A commercially available from Nissin Chemical Co., Ltd. tg 76° C.) | 3.1 parts |
| silica fillers (Sylophobic 100 commercially available from Fuji Silysia Chemical, Ltd.) | 4.6 parts |
| methyl ethyl ketone | 20.7 parts |
| toluene | 10.0 parts |

Example 13

A hot-stamping foil of Example 13 was produced in the same method as in Example 1 except that the following ink B for forming an adhesive layer was used in place of the ink A for forming an adhesive layer.

(Ink B for Forming an Adhesive Layer)

| | |
|---|---|
| ethylene(meth)acrylic acid copolymer dispersion solution (Nucrel AN4213C commercially available from D Pont-Mitsui Polychemicals Co., Ltd. melting point of 88° C., dispersion solvent toluene/ethyl acetate) | 91.5 parts |
| silica (Sylophobic 4004 commercially available from Fuji Silysia Chemical, Ltd.) | 0.2 parts |
| nano silica dispersion solution (MEK-ST commercially available from Nissan Chemical Corporation) | 6.1 parts |
| methyl ethyl ketone | 2.2 parts |

Example 14

A hot-stamping foil of Example 14 was produced in the same method as in Example 1 except that the following ink C for forming an adhesive layer was used in place of the ink A for forming an adhesive layer.

(Ink C for Forming an Adhesive Layer)

| | |
|---|---|
| acrylic resin | 26.9 parts |
| polyester resin | 0.7 parts |
| anti-foaming agent | 0.1 parts |
| silica | 0.8 parts |
| nano silica | 23.5 parts |
| methyl ethyl ketone | 6.9 parts |
| toluene | 1.1 parts |
| ethylene(meth)acrylic acid copolymer dispersion solution (Nucrel AN4213C commercially available from Du Pont-Mitsui Polychemicals Co., Ltd. melting point of 88° C., dispersion solvent toluene/ethyl acetate) | 40 parts |

Comparative Example 1

A hot-stamping foil of Comparative Example 1 was produced in the same method as in Example 1 except that the following ink O for forming a sinking control layer was used in place of the ink A for forming a sinking control layer.

(Ink O for Forming a Sinking Control Layer)

| | |
|---|---|
| vinyl chloride-vinyl acetate copolymer (E15/45M) | 20 parts |
| methyl ethyl ketone | 40 parts |
| toluene | 40 parts |

Comparative Example 2

A hot-stamping foil of Comparative Example 2 was produced in the same method as in Example 1 except that the following ink P for forming a sinking control layer was used in place of the ink A for forming a sinking control layer.

(Ink P for Forming a Sinking Control Layer)

| | |
|---|---|
| vinyl chloride-vinyl acetate copolymer (Solbin A) | 20 parts |
| methyl ethyl ketone | 40 parts |
| toluene | 40 parts |

The following items of the hot-stamping foils of the examples were evaluated.

(Measurement of a Sinking Amount of Spacer Particles During Thermal Pressing)

8 hot-stamping foils were stacked, and inserted between a pair of PET sheet. In this state, under thermal pressure conditions of 2 kgf/cm$^2$ at 60° C., thermal pressing was applied for 20 minutes (heat seal tester TP-701C commercially available from Tester Sangyo Co., Ltd. was used).

A total thickness of the hot-stamping foil before and after thermal pressing was measured at 5 points that were randomly set, and a sinking amount was calculated by the following method.

An amount by which the film thickness decreased when the same sample as above in which 8 hot-stamping foils were stacked and inserted between a pair of PET sheet was thermally pressed for 60 seconds under conditions (overload thermal pressure) of 115° C. and 0.42 t/cm$^2$ was set as a value of 100% sinking. An amount of the film thickness reduced when thermal pressing was applied at 2 kgf/cm$^2$ and 60° C. (transfer thermal pressure) was calculated with respect to this value was set as a value of a sinking amount of spacer particles.

This calculation was performed at 5 points and an average value thereof was used.

(Evaluation of Blocking Under Storage Conditions)

1,000 hot-stamping foils of respective examples cut to a length of 100 mm and a width of 24 mm were arranged in the length direction on the outer peripheral surface of a 100 m PET sheet wound in a roll shape, and a total of 100 m of the hot-stamping foils were wound. These were stored at 60° C. for 24 hours, and additionally stored at room temperature for 12 hours, and the hot-stamping foils were then extracted. The hot-stamping foils stacked in the thickness direction were sequentially separated and evaluated in the following two classifications.

○ (good): the laminated optical structure adhered to the carrier of the lower hot-stamping foil was not observed x (bad): at least a part of the laminated optical structure adhered to the carrier on the lower hot-stamping foil was observed.

(Evaluation of White Turbidity Defects Generated after Transfer)

High quality paper with a thickness of about 200 μm was set as a transfer target, hot-stamping foils of respective examples were transferred under conditions of a plate surface temperature of 115° C., a pressure of 1.05 t/cm$^2$, and a pressurization time of 0.3 seconds. Then, a reflection density (absolute density, color channel K) of the surface of the transferred laminated optical structure was measured using a reflection densitometer (RD918 commercially available from Macbeth, measurement area of φ2 mm). Evaluation was performed as the following two classifications.

○ (good): no white turbidity defects (reflection density of 1.75 or more)

x (bad): white turbidity defects (reflection density of less than 1.75)

Figure 6:
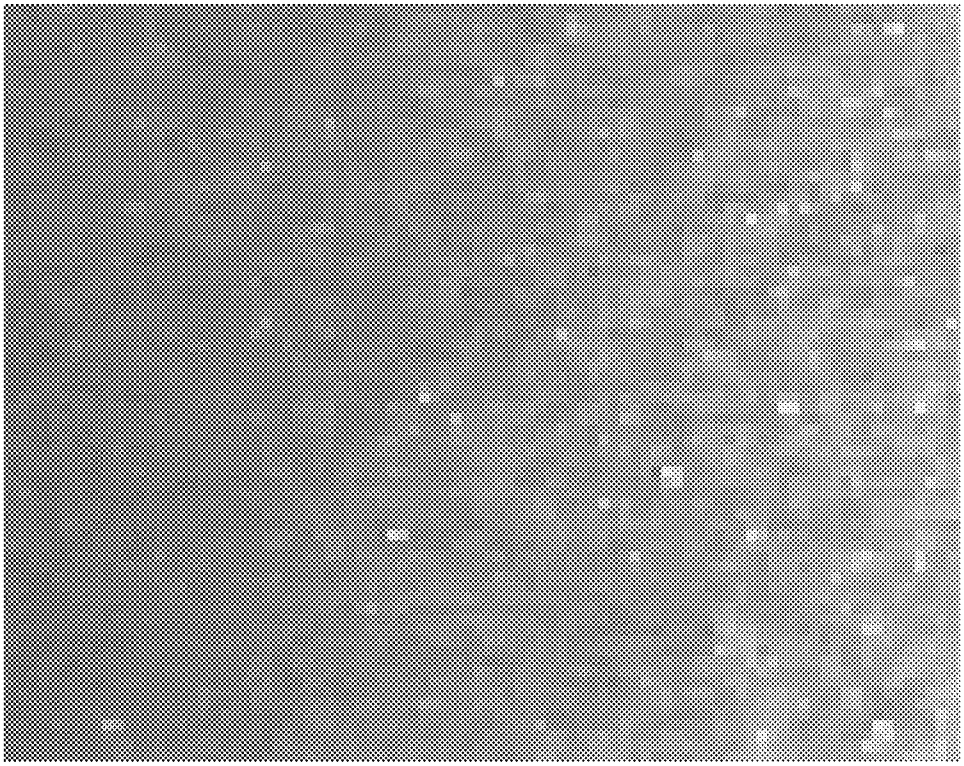
FIG. 6 is an image of a laminated optical decoration after transfer in which no white turbidity occurs.
Figure 7:
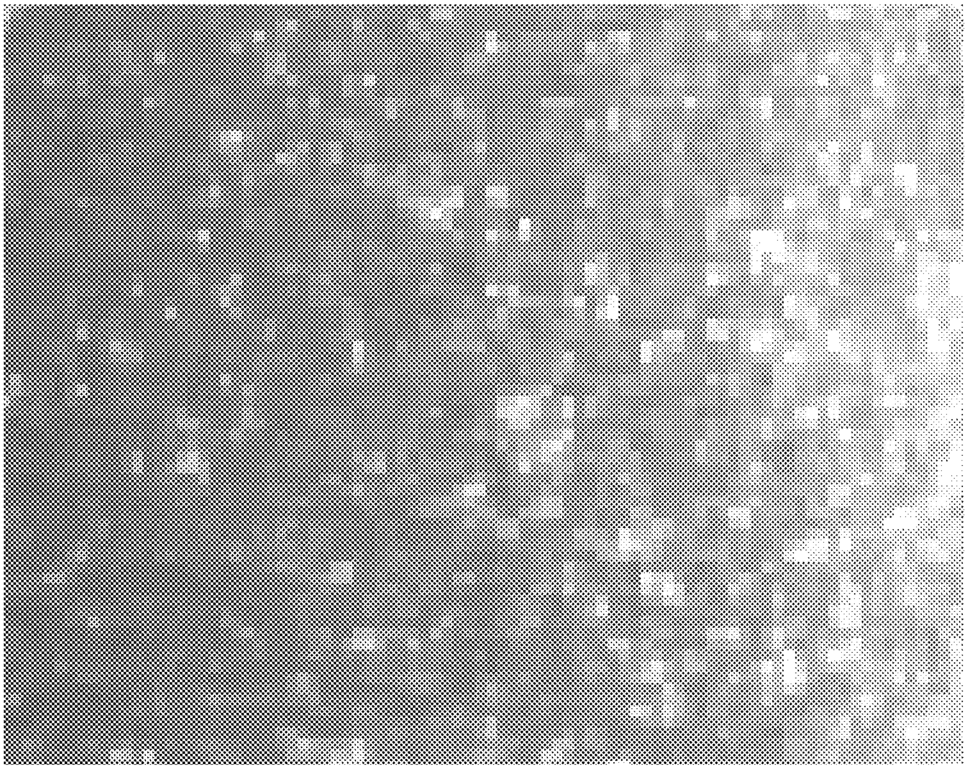
FIG. 7 is an image of a laminated optical decoration after transfer in which white turbidity occurs.

For reference, FIG. 6 shows an image in which there were no white turbidity defects, and FIG. 7 shows an image in which there were white turbidity defects.

The results are shown in Table 1.

TABLE 1

| | Sinking ratio of first fillers | Blocking prevention | White turbidity prevention |
|---|---|---|---|
| Example 1 | 47.0% | ○ | ○ |
| Example 2 | 30.8% | ○ | ○ |
| Example 3 | 37.0% | ○ | ○ |
| Example 4 | 51.7% | ○ | ○ |
| Example 5 | 24.0% | ○ | ○ |
| Example 6 | 37.3% | ○ | ○ |
| Example 7 | 46.2% | ○ | ○ |
| Example 8 | 43.8% | ○ | ○ |
| Example 9 | 35.8% | ○ | ○ |
| Example 10 | 26.8% | ○ | ○ |
| Example 11 | 25.8% | ○ | ○ |
| Example 12 | 58.1% | ○ | ○ |
| Example 13 | 33.4% | ○ | ○ |
| Example 14 | 40.1% | ○ | ○ |
| Comparative Example 1 | 18.6% | ○ | X |
| Comparative Example 2 | 14.4% | ○ | X |

As shown in Table 1, in hot-stamping foils of the examples in which a sinking amount of spacer particles during transfer thermal pressing with respect to a sinking amount of spacer particles during overload thermal pressing was 20% or more and 60% or less, both blocking prevention and white turbidity prevention during transfer were achieved.

On the other hand, in Comparative Examples 1 and 2 in which a sinking amount of spacer particles during transfer thermal pressing with respect to a sinking amount of spacer particles during overload thermal pressing was less than 20%, since the sinking control layer was hard even during transfer thermal pressing, spacer particles penetrated through the sinking control layer, and white turbidity occurred.

In addition, as shown in Examples 10 and 11, it was understood that, even if a vinyl chloride-vinyl acetate copolymer was not used for the sinking control layer, both blocking prevention and white turbidity prevention during transfer were achieved by setting a sinking amount of spacer particles during transfer thermal pressing with respect to a sinking amount of spacer particles during overload thermal pressing to 20% or more and 60% or less.

Subsequently, a second group of examples will be described. In the examples of the second group, the sinking control layer contained a deformation limiting agent which is a high glass transition temperature polymer having a glass transition point of 110° C. or lower.

Figure 8:
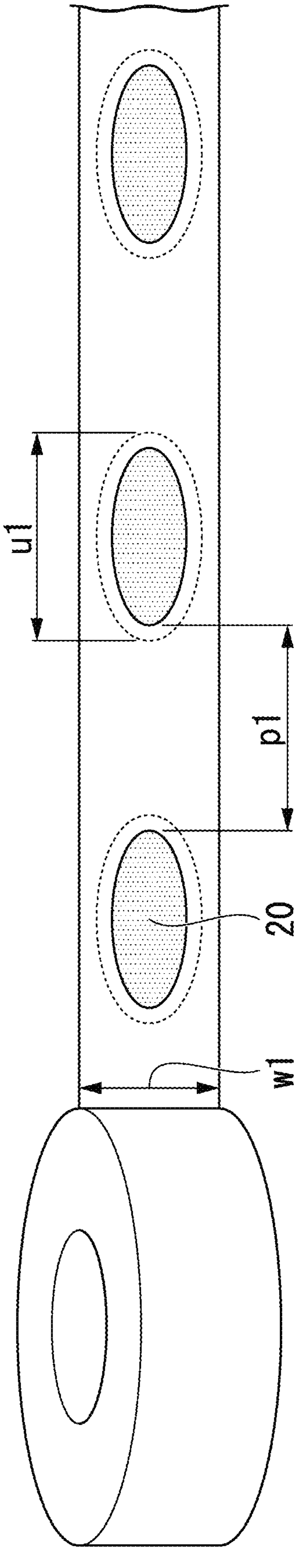
FIG. 8 is a diagram schematically showing a mode of a hot-stamping foil of an example of a second group.

A form of the hot-stamping foil in the following examples is shown in FIG. 8. The hot-stamping foil had a ribbon shape and a width w1 of the roll was 20 mm. The laminated optical structure 20 transferred to the transfer target had an elliptical patch shape with a long axis of 15 mm and a short axis of 12 mm. An interval p1 between the transferred laminated optical structures 20 was 3 mm. An area ratio of the laminated optical structure in the hot-stamping foil of a unit length u1 (15 mm) was 30 to 40%.

Example 2-1

A hot-stamping foil of Example 2-1 was produced in the same method as in Example 1 except that the following ink BA for forming a sinking control layer was used in place of the ink A for forming a sinking control layer.

(Ink BA for Forming a Sinking Control Layer)

| | |
|---|---|
| soft resin: acrylic resin (tg −46° C.) | 63.0 parts |
| deformation limiting agent: vinyl chloride-vinyl acetate copolymer (Solbin A tg 76° C.) | 2.0 parts |
| silica fillers (Sylophobic 100 commercially available from Fuji Silysia Chemical, Ltd.) | 4.3 parts |
| methyl ethyl ketone | 20.7 parts |
| toluene | 10 parts |

Example 2-2

A hot-stamping foil of Example 2-2 was produced in the same method as in Example 2-1 except that the following ink BC for forming a sinking control layer was used in place of the ink BA for forming a sinking control layer.

(Ink BC for Forming a Sinking Control Layer)

| | |
|---|---|
| acrylic resin (tg −46° C.) | 64.0 parts |
| vinyl chloride-vinyl acetate copolymer (Solbin A tg 76° C.) | 1.9 parts |
| silica fillers (Sylophobic 100 commercially available from Fuji Silysia Chemical, Ltd.) | 3.4 parts |
| methyl ethyl ketone | 20.7 parts |
| toluene | 10 parts |

Example 2-3

A hot-stamping foil of Example 2-3 was produced in the same method as in Example 2-1 except that the following ink BD for forming a sinking control layer was used in place of the ink BA for forming a sinking control layer.

(Ink BD for Forming a Sinking Control Layer)

| | |
|---|---|
| acrylic resin (tg −46° C.) | 62.5 parts |
| vinyl chloride-vinyl acetate copolymer (Solbin A tg 76° C.) | 3.2 parts |
| silica fillers (Sylophobic 100 commercially available from Fuji Silysia Chemical, Ltd.) | 3.6 parts |
| methyl ethyl ketone | 20.7 parts |
| toluene | 10 parts |

Example 2-4

A hot-stamping foil of Example 2-4 was produced in the same method as in Example 2-1 except that the following ink BE for forming a sinking control layer was used in place of the ink BA for forming a sinking control layer.

(Ink BE for Forming a Sinking Control Layer)

| | |
|---|---|
| acrylic resin (tg −46° C.) | 63.3 parts |
| vinyl chloride-vinyl acetate copolymer (Solbin A tg 76° C.) | 3.1 parts |
| silica fillers (Sylophobic 100 commercially available from Fuji Silysia Chemical, Ltd.) | 2.9 parts |
| methyl ethyl ketone | 20.7 parts |
| toluene | 10 parts |

Example 2-5

A hot-stamping foil of Example 2-5 was produced in the same method as in Example 2-1 except that the following ink BF for forming a sinking control layer was used in place of the ink BA for forming a sinking control layer.

(Ink BF for Forming a Sinking Control Layer)

| | |
|---|---|
| acrylic resin (tg −46° C.) | 63.6 parts |
| vinyl chloride-vinyl acetate copolymer (Solbin A tg 76° C.) | 3.2 parts |
| silica fillers (Sylophobic 100 commercially available from Fuji Silysia Chemical, Ltd.) | 2.5 parts |
| methyl ethyl ketone | 20.7 parts |
| toluene | 10 parts |

Example 2-6

A hot-stamping foil of Example 2-6 was produced in the same method as in Example 2-1 except that the following ink BG for forming a sinking control layer was used in place of the ink BA for forming a sinking control layer.

(Ink BG for Forming a Sinking Control Layer)

| | |
|---|---|
| acrylic resin (tg −46° C.) | 64.3 parts |
| vinyl chloride-vinyl acetate copolymer (Solbin A tg 76° C.) | 3.1 parts |
| silica fillers (Sylophobic 100 commercially available from Fuji Silysia Chemical, Ltd.) | 1.9 parts |
| methyl ethyl ketone | 20.7 parts |
| toluene | 10 parts |

Example 2-7

A hot-stamping foil of Example 2-7 was produced in the same method as in Example 2-1 except that the following ink BH for forming a sinking control layer was used in place of the ink BA for forming a sinking control layer.

(Ink BH for Forming a Sinking Control Layer)

| | |
|---|---|
| acrylic resin (tg −37° C.) | 64.3 parts |
| vinyl chloride-vinyl acetate copolymer (Solbin A tg 76° C.) | 3.1 parts |
| silica fillers (Sylophobic 100 commercially available from Fuji Silysia Chemical, Ltd.) | 1.9 parts |
| methyl ethyl ketone | 20.7 parts |
| toluene | 10 parts |

Example 2-8

A hot-stamping foil of Example 2-8 was produced in the same method as in Example 2-1 except that the following ink BI for forming a sinking control layer was used in place of the ink BA for forming a sinking control layer.

(Ink BI for Forming a Sinking Control Layer)

| | |
|---|---|
| acrylic resin (tg 20° C.) | 64.3 parts |
| vinyl chloride-vinyl acetate copolymer (Solbin A tg 76° C.) | 3.1 parts |
| silica fillers (Sylophobic 100 commercially available from Fuji Silysia Chemical, Ltd.) | 1.9 parts |
| methyl ethyl ketone | 20.7 parts |
| toluene | 10 parts |

Regarding the examples of the second group, transfer quality and white turbidity occurring in the laminated optical structure were evaluated. The white turbidity was evaluated in the same procedure as in the first group (Examples 1 to 14 and Comparative Examples 1 and 2). The transfer quality was evaluated in the following manner.

(Transfer Quality)

High quality paper with a thickness of about 200 μm was set as a transfer target. The hot-stamping foil and the transfer target were cut into a width of 20 mm×a length of 200 mm, and transferred at intervals of 30 mm in the length direction under conditions of a plate surface temperature 115° C., a pressure of 1.05 t/cm$^2$, and a pressurization time of 0.3 seconds. Pulling was performed at 1 kN 100% and 1,000 mm/min in the direction of 90 degrees using Tensilon STA1225 (commercially available from ORIENTEC), the length of the burr part generated around the laminated optical structure was measured. Evaluation was performed in the following two steps.

○ (good): the length of the burr part was 5 mm or less x (bad): the length of the burr part was 5 mm or more The results are shown in Table 2. Although not shown in Table 2, blocking was suitably prevented in all of the hot-stamping foils according to the examples of the second group.

TABLE 2

| Examples | Transfer quality | White turbidity prevention |
|---|---|---|
| Example 2-1 | ○ | ○ |
| Example 2-2 | ○ | ○ |
| Example 2-3 | ○ | ○ |
| Example 2-4 | ○ | ○ |
| Example 2-5 | ○ | ○ |
| Example 2-6 | ○ | ○ |
| Example 2-7 | ○ | ○ |
| Example 2-8 | ○ | ○ |

When the laminated optical decoration partially formed was transferred to the transfer target by hot stamping, generally flat hot stamping was used, and burrs were likely to be generated on the periphery of the transfer area during hot stamping.

In addition, in flat hot stamping, since a thermal pressure was concentrated on the transfer area, a pressure applied to the transfer area was likely to increase and white turbidity was likely to occur.

In the examples of the second group, both transfer quality and white turbidity prevention were favorable.

When the deformation limiting agent of the sinking control layer was a high glass transition temperature polymer having a softening temperature of 90° C. or higher and 130° C. or lower, the high glass transition temperature polymer softened and become highly elastic inside the transfer area during hot stamping, but the high glass transition temperature polymer had low elasticity outside the transfer area because it did not soften. Therefore, it was thought that, when the carrier was released in the final process of hot stamping and only the laminated optical structure in the transfer area was transferred, stress was concentrated on the high glass transition temperature polymer at the boundary of the transfer area of the sinking control layer, the boundary of the transfer area of the sinking control layer was reliably broken, and the occurrence of burrs during transfer was reduced.

In addition, it was thought that, when the deformation limiting agent of the sinking control layer was a high glass transition temperature polymer, the deformation limiting agent in the transfer area also softened during hot stamping, a pressure concentrated on the spacer particles of the adhesive layer in the transfer area was suitably absorbed by the sinking control layer, and white turbidity was prevented.

Subsequently, a third group of examples and comparative examples will be described. The examples of the third group had a configuration in which the soft resin of the sinking control layer was a crystalline resin.

Figure 9:
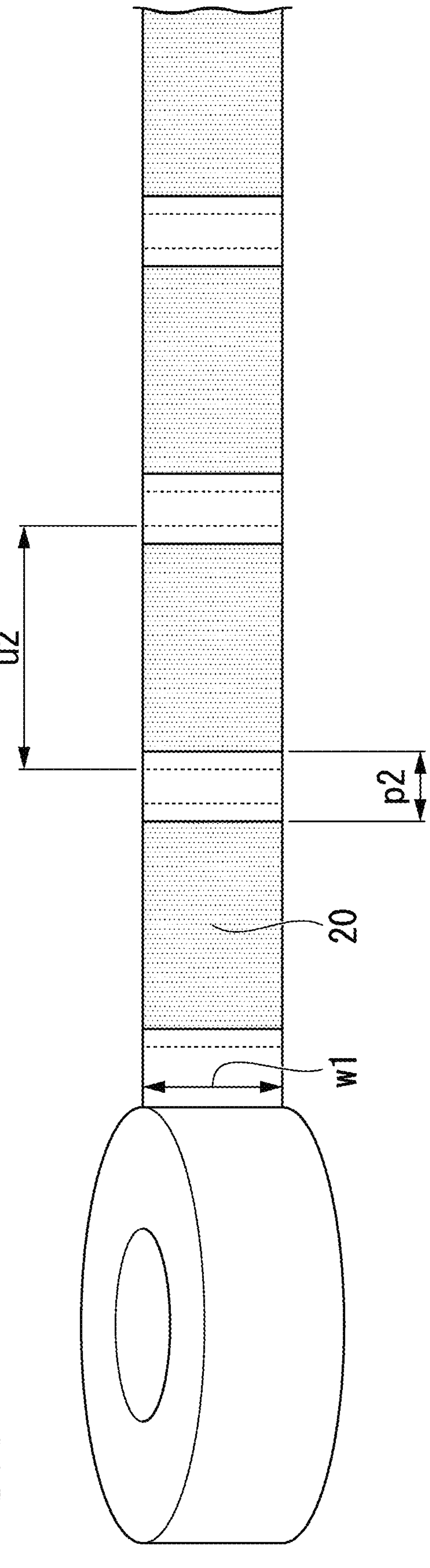
FIG. 9 is a diagram schematically showing a mode of a hot-stamping foil of an example of a third group.

The form of the hot-stamping foils in the following examples and comparative examples is shown in FIG. 9. A width w1 of the hot-stamping foil roll was 8 mm. The laminated optical structure 20 transferred to the transfer target had a rectangular shape with a short side of 8 mm and a long side of 60 mm, and the laminated optical structure 20 was entirely formed in the width direction of the hot-stamping foil. An interval p2 between the transferred laminated optical structures 20 was 15 mm. An area ratio of the laminated optical structure in the hot-stamping foil of a unit length u2 (75 mm) was 80%.

Example 3-1

A hot-stamping foil of Example 3-1 was produced in the same method as in Example 1 except that the following ink CA for forming a sinking control layer and the following ink CA for forming an adhesive layer were used in place of the ink A for forming a sinking control layer and the ink A for forming an adhesive layer.

(Ink CA for Forming a Sinking Control Layer)

| | |
|---|---|
| crystalline polyester (soft resin (with a melting point of 100° C.), dispersion solution) | 62.4 parts |
| silica fillers (Sylophobic 100 commercially available from Fuji Silysia Chemical, Ltd.) | 3.8 parts |
| methyl ethyl ketone | 33.8 parts |

(Ink CA for Forming an Adhesive Layer)

| | |
|---|---|
| acrylic resin (resin component) | 49.2 parts |
| polyester resin (resin component) | 1.3 parts |
| anti-foaming agent | 0.3 parts |
| silica (spacer particles with an average particle size of 8.0 μm, measured using a laser method) | 1.4 parts |
| silica (spacer particles with an average particle size of 14.0 μm, measured using a laser method) | 0.9 parts |
| nano silica (inorganic powder fillers with an average particle size of 10 to 15 nm, measured using a laser method) | 32.3 parts |
| methyl ethyl ketone | 12.6 parts |
| toluene | 2.0 parts |

Example 3-2

A hot-stamping foil of Example 3-2 was produced in the same method as in Example 3-1 except that the following ink CB for forming a sinking control layer was used in place of the ink CA for forming a sinking control layer.

(Ink CB for Forming a Sinking Control Layer)

| | |
|---|---|
| crystalline polyester (soft resin (with a melting point of 100° C.), dispersion solution) | 66.7 parts |
| vinyl chloride-vinyl acetate copolymer | 2.7 parts |
| silica fillers (Sylophobic 100 commercially available from Fuji Silysia Chemical, Ltd.) | 2.0 parts |
| methyl ethyl ketone | 28.6 parts |

Example 3-3

A hot-stamping foil of Example 3-3 was produced in the same method as in Example 3-1 except that the following ink CC for forming a sinking control layer was used in place of the ink CA for forming a sinking control layer.

(Ink CC for Forming a Sinking Control Layer)

| | |
|---|---|
| crystalline polyester (soft resin (with a melting point of 100° C.), dispersion solution) | 76.9 parts |
| silica fillers (Sylophobic 100 commercially available from Fuji Silysia Chemical, Ltd.) | 2.3 parts |
| methyl ethyl ketone | 20.8 parts |

Example 3-4

A hot-stamping foil of Example 3-4 was produced in the same method as in Example 3-1 except that the following ink CD for forming a sinking control layer was used in place of the ink CA for forming a sinking control layer.

(Ink CD for Forming a Sinking Control Layer)

| | |
|---|---|
| crystalline polyester (soft resin (with a melting point of 100° C.), dispersion solution) | 62.4 parts |
| silica fillers (Sylophobic 100 commercially available from Fuji Silysia Chemical, Ltd.) | 3.8 parts |
| methyl ethyl ketone | 33.8 parts |

Example 3-5

A hot-stamping foil of Example 3-5 was produced in the same method as in Example 3-1 except that the following ink CE for forming a sinking control layer was used in place of the ink CA for forming a sinking control layer.

(Ink CE for Forming a Sinking Control Layer)

| | |
|---|---|
| crystalline polyester (soft resin (with a melting point of 107° C.), dispersion solution) | 60.4 parts |
| silica fillers (Sylophobic 100 commercially available from Fuji Silysia Chemical, Ltd.) | 5.8 parts |
| methyl ethyl ketone | 33.8 parts |

Example 3-6

A hot-stamping foil of Example 3-6 was produced in the same method as in Example 3-1 except that the following ink CF for forming a sinking control layer was used in place of the ink CA for forming a sinking control layer.
(Ink CF for Forming a Sinking Control Layer)

| | |
|---|---|
| crystalline polyester (soft resin (with a melting point of 111° C.), dispersion solution) | 62.4 parts |
| silica fillers (Sylophobic 100 commercially available from Fuji Silysia Chemical, Ltd.) | 3.8 parts |
| methyl ethyl ketone | 33.8 parts |

Example 3-7

A hot-stamping foil of Example 3-7 was produced in the same method as in Example 3-1 except that the following ink CB for forming an adhesive layer was used in place of the ink CA for forming an adhesive layer.
(Ink CB for Forming an Adhesive Layer)

| | |
|---|---|
| acrylic resin (resin component) | 49.2 parts |
| polyester resin (resin component) | 1.3 parts |
| anti-foaming agent | 0.3 parts |
| silica (break promoting particles with an average particle size of 3.4 to 5.5 μm, aspect ratio of 30 to 50, measured using a laser method) | 1.4 parts |
| silica (spacer particles with an average particle size of 14.0 μm, measured using a laser method) | 0.9 parts |
| nano silica (inorganic powder fillers with an average particle size of 10 to 15 nm, measured using a laser method) | 32.3 parts |
| methyl ethyl ketone | 12.6 parts |
| toluene | 2.0 parts |

Example 3-8

A hot-stamping foil of Example 3-8 was produced in the same method as in Example 3-1 except that the following ink CC for forming an adhesive layer was used in place of the ink CA for forming an adhesive layer.
(Ink CC for Forming an Adhesive Layer)

| | |
|---|---|
| acrylic resin (resin component) | 49.2 parts |
| polyester resin (resin component) | 1.3 parts |
| anti-foaming agent | 0.3 parts |
| silica (break promoting particles with an average particle size of 2.7 μm, measured using a laser method) | 1.4 parts |
| silica (spacer particles with an average particle size of 14.0 μm, measured using a laser method) | 0.9 parts |
| nano silica (inorganic powder fillers with an average particle size of 10 to 15 nm, measured using a laser method) | 32.3 parts |

-continued

| | |
|---|---|
| methyl ethyl ketone | 12.6 parts |
| toluene | 2.0 parts |

Example 3-9

A hot-stamping foil of Example 3-9 was produced in the same method as in Example 3-1 except that the following ink CD for forming an adhesive layer was used in place of the ink CA for forming an adhesive layer.
(Ink CD for Forming an Adhesive Layer)

| | |
|---|---|
| acrylic resin (resin component) | 49.2 parts |
| polyester resin (resin component) | 1.3 parts |
| anti-foaming agent | 0.3 parts |
| silica (spacer particles with an average particle size of 5.3 μm, measured using a laser method) | 1.4 parts |
| silica (spacer particles with an average particle size of 8.84 μm, measured using a laser method) | 0.9 parts |
| nano silica (inorganic powder fillers with an average particle size of 10 to 15 nm, measured using a laser method) | 32.3 parts |
| methyl ethyl ketone | 12.6 parts |
| toluene | 2.0 parts |

Example 3-10

A hot-stamping foil of Example 3-10 was produced in the same method as in Example 3-1 except that the following ink CE for forming an adhesive layer was used in place of the ink CA for forming an adhesive layer.
(Ink CE for Forming an Adhesive Layer)

| | |
|---|---|
| acrylic resin (resin component) | 49.2 parts |
| polyester resin (resin component) | 1.3 parts |
| anti-foaming agent | 0.3 parts |
| silica (spacer particles with an average particle size of 6.6 μm, measured using a laser method) | 1.4 parts |
| silica (spacer particles with an average particle size of 8.0 μm, measured using a laser method) | 0.9 parts |
| nano silica (inorganic powder fillers with an average particle size of 10 to 15 nm, measured using a laser method) | 32.3 parts |
| methyl ethyl ketone | 12.6 parts |
| toluene | 2.0 parts |

Comparative Example 3-1

A hot-stamping foil of Comparative Example 3-1 was produced in the same method as in Example 3-1 except that the following ink CF for forming an adhesive layer was used in place of the ink CA for forming an adhesive layer.
(Ink CF for Forming an Adhesive Layer)

| | |
|---|---|
| acrylic resin (resin component) | 51.5 parts |
| polyester resin (resin component) | 1.3 parts |
| anti-foaming agent | 0.3 parts |
| nano silica (inorganic powder fillers with an average particle size of 10 to 15 nm, measured using a laser method) | 32.3 parts |
| methyl ethyl ketone | 12.6 parts |
| toluene | 2.0 parts |

In the examples and comparative example of the third group, blocking under storage conditions was evaluated and adhesion after transfer under low temperature and low pressure conditions was evaluated. Blocking under storage conditions was evaluated in the same procedure as in the first group (Examples 1 to 14 and Comparative Examples 1 to 3). Adhesion after transfer under low temperature and low pressure conditions was evaluated in the following manner.

(Evaluation of Adhesion after Transfer Under Low Temperature and Low Pressure Conditions)

High quality paper with a thickness of about 200 μm was set as a transfer target, and the hot-stamping foils of respective examples were transferred under conditions of a plate surface temperature 100° C., a pressure of 0.4 t/cm$^2$, and a pressurization time of 0.3 seconds. A cellophane tape (Nichiban LP-24) was adhered to a transfer location and then released at a rate of 1 cm/2.5 sec in a direction perpendicular to the transfer surface. The released cellophane tape was adhered to a black PET film (Lumirror 188×30 commercially available from Toray Industries, Inc.), and adhesion was visually evaluated. When the released point-like laminated optical structures were densely attached, this was evaluated as x (there was a problem in adhesion), and when they were scattered or not present, this was evaluated as ○ (there was no problem in adhesion). This criterion is based on the fact that scattered release had little influence on the appearance of the transferred pattern, but dense release had a large influence on the appearance of the transferred pattern.

The results are shown in Table 3. Although not shown in Table 3, in all of the hot-stamping foils according to the examples of the third group, a sinking amount of spacer particles during transfer thermal pressing with respect to a sinking amount of spacer particles during overload thermal pressing was 20% or more and 60% or less, and white turbidity after transfer was suitably prevented.

TABLE 3

| | Blocking prevention | Adhesion after transfer under low temperature and low pressure conditions |
|---|---|---|
| Example 3-1 | ○ | ○ |
| Example 3-2 | ○ | ○ |
| Example 3-3 | ○ | ○ |
| Example 3-4 | ○ | ○ |
| Example 3-5 | ○ | ○ |
| Example 3-6 | ○ | ○ |
| Example 3-7 | ○ | ○ |
| Example 3-8 | ○ | ○ |
| Example 3-9 | ○ | ○ |
| Example 3-10 | ○ | ○ |
| Comparative Example 3-1 | X | ○ |

The examples of the third group are also called a "stripe foil" among the hot-stamping foils.

The stripe foil is formed such that the long side of the laminated optical structure is as long as 100 mm or more, a plurality of laminated optical structures that are arranged in the width direction were transferred in many cases, and the transfer area is likely to be large. As a result, a thermal pressure during transfer is unlikely to be applied. It is important that transfer can be performed with sufficient adhesion even under low temperature and low pressure conditions.

Regarding a simple method of improving adhesion to a transfer target, a method of increasing tackiness of an adhesive layer, a method of lowering a melting point of an adhesive layer, and the like were conceivable. However, when such a method was used, since blocking was likely to occur, it was also very difficult to achieve blocking prevention.

In the examples of the third group, both strong adhesion after transfer under low temperature and low pressure conditions, and blocking prevention were achieved. This was considered to be obtained by the following mechanism.

In all of the examples of the third group, the sinking control layer contained a crystalline resin having a melting point. Therefore, when a resin having an appropriate melting point was selected in consideration of temperature conditions during transfer, it was also possible to melt the sinking control layer during transfer under low temperature and low pressure conditions. As a result, the sinking control layer during transfer melted, heat during transfer was likely to be transmitted to the adhesive layer, and it was possible to realize strong adhesion.

In addition, when a resin having a melting point which does not melt during storage was selected, since it was possible to appropriately control sinking of spacer particles of the adhesive layer as described above, it was possible to obtain the blocking prevention effect at the same time.

Also in Examples 3-1, and 3-7 to 3-10 in which three types of particles with different particle sizes were contained in the adhesive layer, favorable blocking prevention was exhibited. This was thought to be caused by the fact that, even if the soft resin was applied to the sinking control layer, particles with a small particle size did not sink during storage because particles with a large particle size reduced a pressure applied to particles with a small particle size. A pressure was likely to be concentrated on particles with a large size, but the number of the particles was reduced, and thus it was possible to prevent the occurrence of visible whitening.

As described above, it was indicated that the configuration of the examples of the third group was particularly suitable for the configuration of the stripe foil.

What is claimed is:

1. A hot-stamping foil which is transferred to a transfer target by applying a transfer thermal pressure, comprising:
- a carrier that is a base film or a coated base film;
- a laminated optical decoration having a laminated optical structure formed on the carrier;
- a sinking control layer which contains a soft resin and a deformation limiting agent and is formed on the laminated optical structure; and
- an adhesive layer which is formed on the sinking control layer,
- wherein the adhesive layer contains a resin component which contains a thermoplastic resin having a glass transition temperature lower than room temperature and defines a thickness of the adhesive layer, and
  - spacer particles which have a particle size larger than the thickness of the adhesive layer and a portion of which protrude from the resin component, and
- wherein the spacer particles sink into the sinking control layer after transfer thermal pressing.

2. The hot-stamping foil according to claim 1,
- wherein the deformation limiting agent contains at least one of inorganic powder fillers having a particle size smaller than the thickness of the adhesive layer and a high glass transition temperature polymer.

3. The hot-stamping foil according to claim 1,
- wherein the average particle size of the spacer particles is larger than a total thickness which is a sum of the thickness of the adhesive layer and a thickness of the sinking control layer, and is equal to or smaller than twice the total thickness.

4. The hot-stamping foil according to claim 1,
wherein a sinking amount of the spacer particles after the transfer thermal pressing is equal to or greater than 20% and equal to or greater than 60% of a sinking amount of the spacer particles during overload thermal pressing.

5. The hot-stamping foil according to claim 1,
wherein the deformation limiting agent is a vinyl chloride-vinyl acetate copolymer.

6. The hot-stamping foil according to claim 1,
wherein the soft resin is an acid-modified polyolefin resin.

7. The hot-stamping foil according to claim 6,
wherein the acid-modified polyolefin resin is a copolymer resin of polyethylene and (meth)acrylic acid.

8. The hot-stamping foil according to claim 1,
wherein the soft resin is an acrylic resin.

9. The hot-stamping foil according to claim 1,
wherein the sinking control layer contains a silanol bond.

10. The hot-stamping foil according to claim 1,
wherein the sinking control layer contains a urethane bond.

11. The hot-stamping foil according to claim 1,
wherein the deformation limiting agent contains a high glass transition temperature polymer,
wherein the high glass transition temperature polymer and the soft resin are separated into two phases, and
wherein the high glass transition temperature polymer has a continuous phase, and a glass transition temperature of the high glass transition temperature polymer is equal to or higher than a glass transition temperature of the soft resin.

12. The hot-stamping foil according to claim 1,
wherein the adhesive layer contains powder fillers having a smaller particle size than the thickness of the adhesive layer.

13. A hot-stamping foil which is transferred to a transfer target by applying a transfer thermal pressure, comprising:
a carrier that is a base film or a coated base film;
a laminated optical decoration having a laminated optical structure formed on the carrier;
a sinking control layer which is formed on the laminated optical structure; and
an adhesive layer which is formed on the sinking control layer,
wherein the adhesive layer contains a resin component which defines a thickness of the adhesive layer; and spacer particles which have a particle size larger than the thickness of the adhesive layer and a portion of which protrude from the resin component, and
wherein a sinking amount of the spacer particles after the transfer thermal pressing is equal to or greater than 20% and equal to or greater than 60% of a sinking amount of the spacer particles during overload thermal pressing.

14. The hot-stamping foil according to claim 13,
wherein the adhesive layer contains powder fillers having a smaller particle size than the thickness of the adhesive layer.

15. The hot-stamping foil according to claim 13,
wherein the sinking control layer contains a vinyl chloride-vinyl acetate copolymer resin.

16. The hot-stamping foil according to claim 15,
wherein the sinking control layer further contains an acid-modified polyolefin resin.

17. The hot-stamping foil according to claim 15,
wherein the sinking control layer further contains a copolymer resin of polyethylene and (meth)acrylic acid.

18. The hot-stamping foil according to claim 13,
wherein the sinking control layer contains a silanol bond.

19. The hot-stamping foil according to claim 13,
wherein the sinking control layer contains a urethane bond.

20. The hot-stamping foil according to claim 13,
wherein the sinking control layer is formed of a resin having a melting point.

21. The hot-stamping foil according to claim 20,
wherein the melting point is equal to or smaller than 120° C.

22. The hot-stamping foil according to claim 20,
wherein the sinking control layer contains fillers.

23. The hot-stamping foil according to claim 20,
wherein the adhesive layer contains an acrylic pressure-sensitive adhesive.

24. A print equipped with a laminated optical decoration in which the laminated optical decoration is thermally transferred to a print using the hot-stamping foil according to claim 1.

* * * * *